(12) United States Patent
Hamaguchi et al.

(10) Patent No.: US 11,452,937 B2
(45) Date of Patent: Sep. 27, 2022

(54) COMPUTER-READABLE RECORDING MEDIUM, GAME APPARATUS, AND GAME EXECUTION METHOD

(71) Applicant: SQUARE ENIX CO., LTD., Tokyo (JP)

(72) Inventors: Naoki Hamaguchi, Tokyo (JP); Teruki Endo, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 45 days.

(21) Appl. No.: 17/185,176

(22) Filed: Feb. 25, 2021

(65) Prior Publication Data

US 2021/0268377 A1 Sep. 2, 2021

(30) Foreign Application Priority Data

Feb. 28, 2020 (JP) .............................. JP2020-034128

(51) Int. Cl.
*A63F 13/422* (2014.01)
*A63F 13/56* (2014.01)
*A63F 13/67* (2014.01)
*A63F 13/285* (2014.01)
*A63F 13/5252* (2014.01)

(52) U.S. Cl.
CPC .......... *A63F 13/422* (2014.09); *A63F 13/285* (2014.09); *A63F 13/5252* (2014.09); *A63F 13/56* (2014.09); *A63F 13/67* (2014.09)

(58) Field of Classification Search
CPC .. A63F 13/422; A63F 13/285; A63F 13/5252; A63F 13/56; A63F 13/67

USPC .......................................................... 463/31
See application file for complete search history.

(56) References Cited

U.S. PATENT DOCUMENTS

| | | | | |
|---|---|---|---|---|
| 8,052,527 B2* | 11/2011 | Kawase | .................. | A63F 13/56 463/31 |
| 8,366,528 B2* | 2/2013 | Hayashida | ............ | A63F 13/497 463/7 |
| 8,608,537 B2* | 12/2013 | Harp | ...................... | A63F 13/30 463/9 |

(Continued)

FOREIGN PATENT DOCUMENTS

| | | |
|---|---|---|
| JP | H08-280933 | 10/1996 |
| JP | 2000-167239 | 6/2000 |

(Continued)

OTHER PUBLICATIONS

"Can Camus attack 12 times in a row with his Divide skill?" dated Jul. 9, 2017, Dragon Quest 11 Extreme Strategy Blog [online] (URL:https://dq11.org/blog/894) with a partial English translation.

(Continued)

*Primary Examiner* — Allen Chan
(74) *Attorney, Agent, or Firm* — Greenblum & Bernstein, P.L.C.

(57) ABSTRACT

To provide a game program of high interest is an object. Switching between a manual control and an automatic control of a first player character. Performing an automatic control of a second player character acting as an ally of the first player character. The automatic control of the first player character is executed based on different action setting from the automatic control of the second player character.

20 Claims, 9 Drawing Sheets

(56) References Cited

U.S. PATENT DOCUMENTS

| | | | |
|---|---|---|---|
| 8,926,430 B1* | 1/2015 | Ikeda | A63F 13/40 |
| | | | 463/31 |
| 9,901,814 B2* | 2/2018 | Nonaka | A63F 13/24 |
| 2007/0026944 A1 | 2/2007 | Maehiro et al. | |
| 2007/0066392 A1 | 3/2007 | Itou | |
| 2011/0059801 A1* | 3/2011 | Shiigi | A63F 13/87 |
| | | | 463/43 |
| 2018/0028914 A1 | 2/2018 | Yamaguchi | |
| 2019/0366221 A1* | 12/2019 | Suzuki | A63F 13/88 |

FOREIGN PATENT DOCUMENTS

| | | |
|---|---|---|
| JP | 3869452 B | 10/2006 |
| JP | 2007-075446 | 3/2007 |
| JP | 5732688 B | 4/2015 |
| JP | 2018-015471 | 2/2018 |

OTHER PUBLICATIONS

Office Action dated May 11, 2021 and issued in Japanese patent application No. 2020-034128 along with a partial English translation.

Japanese Office Action dated Jan. 11, 2022 issued in Japanese patent application No. 2020-034128 along with a corresponding English translation.

* cited by examiner

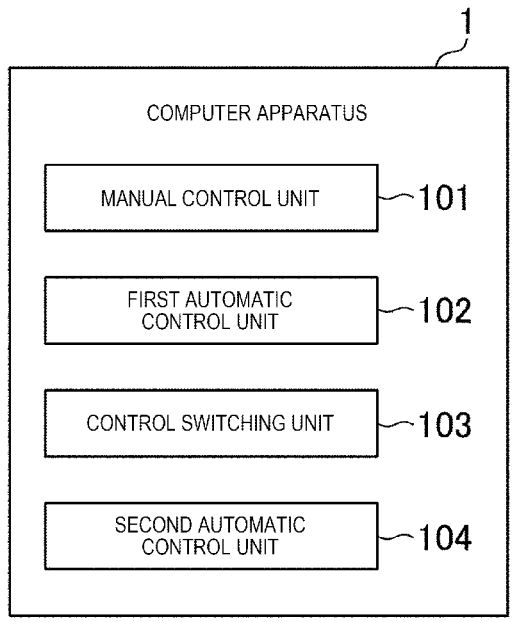
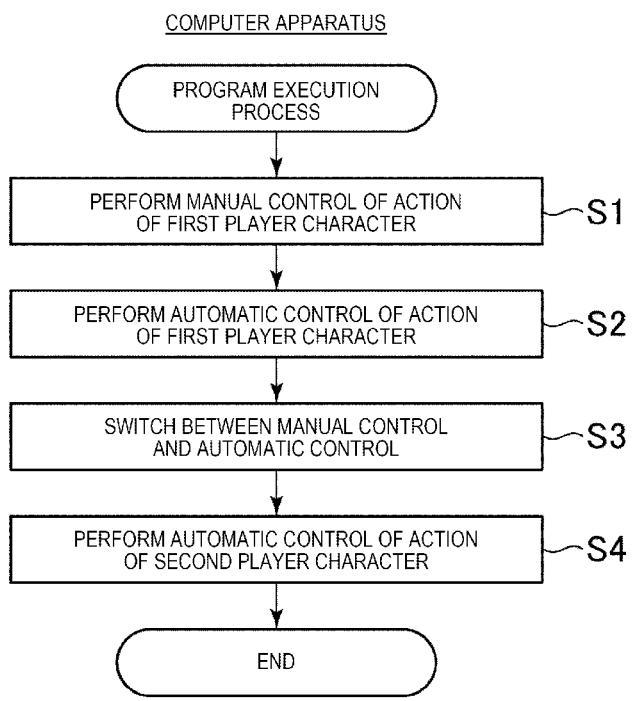

COMPUTER-READABLE RECORDING MEDIUM, GAME APPARATUS, AND GAME EXECUTION METHOD

CROSS REFERENCE TO RELATED APPLICATION

The present disclosure relates to subject matter contained in Japanese Patent Application No. 2020-34128, filed on Feb. 28, 2020, the disclosure of which is expressly incorporated herein by reference in its entirety.

TECHNICAL FIELD

The present invention relates to a computer-readable recording medium, a game apparatus, and a game execution method.

BACKGROUND ART

In the related art, an action game in which the game progresses while a player character operated by a player performs a virtual battle with an enemy character has been enjoyed. A game that can be easily played by an advanced player who is used to playing the action game may not be easy for a beginner who is not used to the action game in a case of moving the player character to an appropriate location or causing the player character to execute a predetermined behavior at an appropriate timing depending on a situation of the game. Consequently, the player may lose interest in the game. Thus, the player character is subjected to an automatic control instead of an operation of the player.

During the action game, a plurality of player characters as allies appear in the game. The player operates one of the player characters, and actions of the remaining player characters are subjected to the automatic control. In such a case, in a case where the player character that is an operation target of the player is subjected to the automatic control, all player characters are subjected to the automatic control based on the same action setting, and interest may be lost.

SUMMARY OF INVENTION

Technical Problem

An object of at least one embodiment of the present invention is to provide a game program, a game apparatus, and a game execution method of high interest.

Solution to Problem

According to a non-limiting aspect, a non-transitory computer-readable recording medium including a game program executed in a computer apparatus including an input device, the game program causing the computer apparatus to function as: a manual controller that controls an action of a first player character in accordance with an operation of a player; a first automatic controller that performs an automatic control of the action of the first player character; a control switcher that switches between a control performed by the manual controller and a control performed by the first automatic controller; and a second automatic controller that performs an automatic control of an action of a second player character acting as an ally of the first player character, wherein the automatic control performed by the first automatic controller is executed based on different action setting from the automatic control performed by the second automatic controller.

According to a non-limiting aspect, a game apparatus including an input device, the game apparatus comprising: a manual controller that controls an action of a first player character in accordance with an operation of a player; a first automatic controller that performs an automatic control of the action of the first player character; a control switcher that switches between a control performed by the manual controller and a control performed by the first automatic controller; and a second automatic controller that performs an automatic control of an action of a second player character acting as an ally of the first player character, wherein the automatic control performed by the first automatic controller is executed based on different action setting from the automatic control performed by the second automatic controller.

According to a non-limiting aspect, a game execution method executed in a computer apparatus including an input device, the game execution method comprising: performing a manual control of an action of a first player character in accordance with an operation of a player; performing a first automatic control that is an automatic control of the action of the first player character; switching between the manual control and the first automatic control; and performing a second control that is an automatic control of an action of a second player character acting as an ally of the first player character, wherein the automatic control performed in the first automatic control is executed based on different action setting from the automatic control performed in the second automatic control.

Advantageous Effects of Invention

One or more of the above problems can be solved with each embodiment of the present invention.

BRIEF DESCRIPTION OF THE DRAWINGS

FIG. 1 is a block diagram illustrating a configuration of a computer apparatus corresponding to at least one embodiment of the present invention.

FIG. 2 is a flowchart of the program execution process corresponding to at least one embodiment of the present invention.

DESCRIPTION OF EMBODIMENTS

Figure 3:
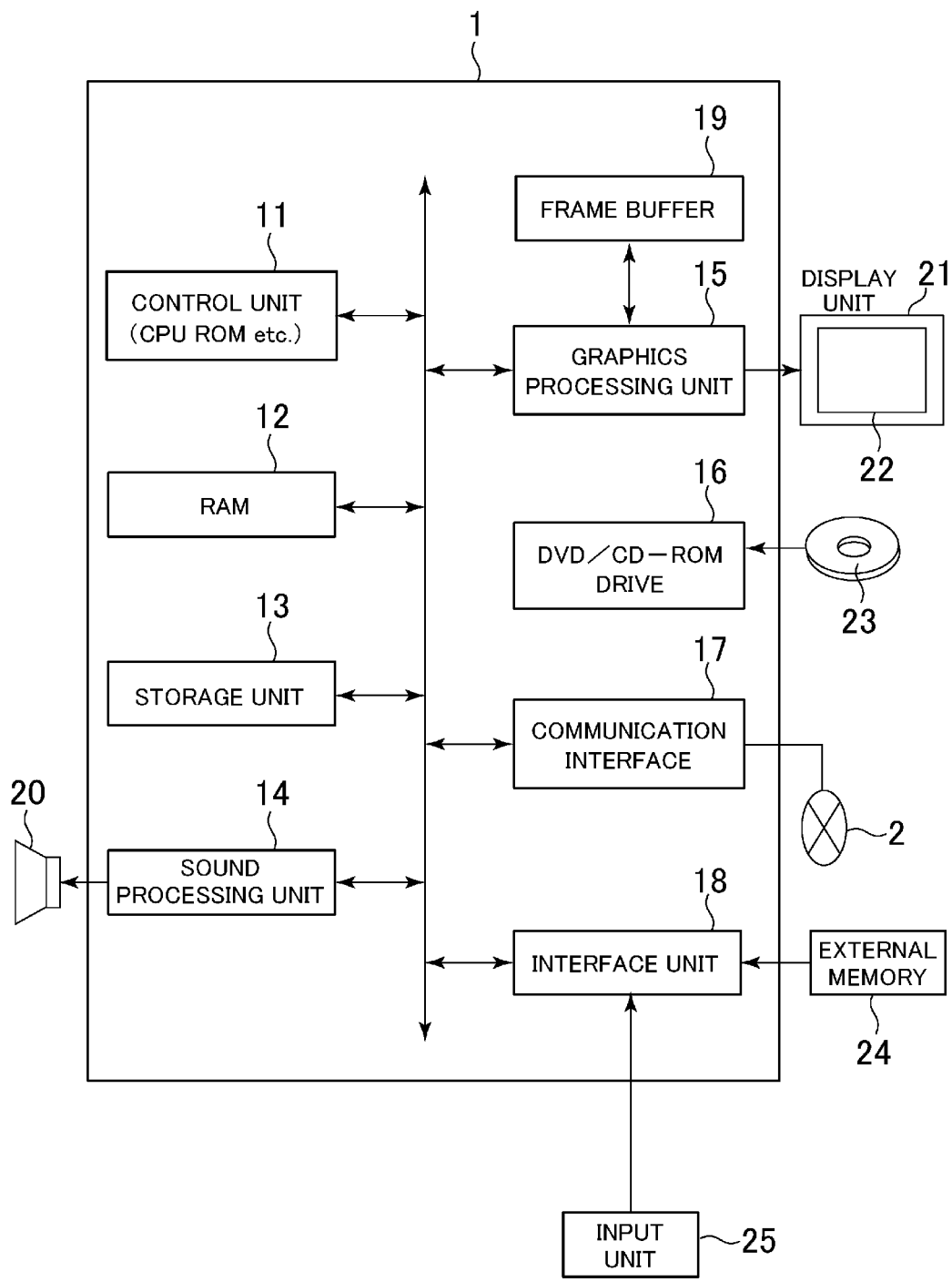
FIG. 3 is a block diagram illustrating a configuration of the computer apparatus corresponding to at least one embodiment of the present invention.

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

A summary of a first embodiment of the present invention will be described. FIG. 1 is a block diagram illustrating a configuration of a computer apparatus corresponding to at least one embodiment of the present invention. A computer apparatus 1 includes an input device. The computer apparatus 1 includes at least a manual control unit 101, a first automatic control unit 102, a control switching unit 103, and a second automatic control unit 104.

The manual control unit 101 controls an action of a first player character in accordance with an operation of a player. The first automatic control unit 102 performs an automatic control of the action of the first player character. The control switching unit 103 switches between a control performed by the manual control unit 101 and a control performed by the first automatic control unit 102. The second automatic control unit 104 performs an automatic control of an action of a second player character that acts as an ally of the first player character. The automatic control performed by the first automatic control unit 102 is executed based on different action setting from the automatic control performed by the second automatic control unit 104.

Next, a program execution process in the first embodiment of the present invention will be described. FIG. 2 is a flowchart of the program execution process corresponding to at least one embodiment of the present invention. The computer apparatus 1 controls the action of the first player character in accordance with an operation of the player (step S1). The action of the first player character is subjected to the automatic control (step S2). Switching is performed between the control performed by the manual control unit 101 and the control performed by the first automatic control unit 102 (step S3). The action of the second player character acting as the ally of the first player character is subjected to the automatic control (step S4). The automatic control performed by the first automatic control unit 102 is executed based on different action setting from the automatic control performed by the second automatic control unit 104.

As one aspect of the first embodiment, a game program of high interest can be provided.

In the first embodiment, the "computer apparatus" refers to an apparatus that has a storage and a control unit and can perform computation in accordance with a predetermined program. For example, the computer apparatus refers to a stationary game console, a portable game console, a wearable terminal, a desktop or laptop personal computer, a tablet computer, or a PDA. In the first embodiment, for example, the "input device" refers to an apparatus that is a peripheral apparatus used for inputting a control signal into the computer apparatus or an information apparatus and that can receive an operation instruction of the player. More specifically, apparatuses and the like using a keyboard, a mouse, a tablet pen, an image scanner, a digital camera, a joystick, a controller, a touch panel, and various sensors are exemplified.

In the first embodiment, for example, the "first player character" refers to a character that is an operation target of the player. In the first embodiment, for example, the "second player character" refers to a character that is not the operation target of the player and acts as the ally of the first player character. In the first embodiment, the "action" is a concept including general motions of the player character and, for example, is exemplified by a movement, behavior, and the like of the player character. In the first embodiment, for example, the "automatic control of the action" refers to an automatic control of the action of the player character in accordance with the predetermined program regardless of the operation of the player. For example, the "action setting" refers to a program for controlling the action of the player character or a parameter used for computation of the program.

Second Embodiment

Next, a summary of a second embodiment of the present invention will be described. FIG. 1 is a block diagram illustrating the configuration of the computer apparatus corresponding to at least one embodiment of the present invention. The computer apparatus 1 includes the input device. The computer apparatus 1 includes at least the manual control unit 101, the first automatic control unit 102, the control switching unit 103, and the second automatic control unit 104.

The manual control unit 101 controls the action of the first player character in accordance with the operation of the player. The first automatic control unit 102 performs an automatic control of the action of the first player character. The control switching unit 103 switches between the control performed by the manual control unit 101 and the control performed by the first automatic control unit 102. The second automatic control unit 104 performs an automatic control of the action of the second player character that acts as the ally of the first player character. The automatic control performed by the first automatic control unit 102 is executed based on different action setting from the automatic control performed by the second automatic control unit 104. The action setting of the automatic control performed by the first automatic control unit 102 causes the first player character to act advantageously for the first player character and the second player character, compared to the action setting of the automatic control performed by the second automatic control unit 104.

Next, the program execution process in the second embodiment of the present invention will be described. FIG. 2 is a flowchart of the program execution process corresponding to at least one embodiment of the present invention. The computer apparatus 1 controls the action of the first player character in accordance with the operation of the player (step S1). The action of the first player character is subjected to the automatic control (step S2). Switching is performed between the control performed by the manual control unit 101 and the control performed by the first automatic control unit 102 (step S3). The action of the second player character acting as the ally of the first player character is subjected to the automatic control (step S4). The automatic control performed by the first automatic control unit 102 is executed based on different action setting from the automatic control performed by the second automatic control unit 104. The action setting of the automatic control performed by the first automatic control unit 102 causes the first player character to act advantageously for the first player character and the second player character, compared to the action setting of the automatic control performed by the second automatic control unit 104.

As one aspect of the second embodiment, the first player character is caused to act advantageously for the first player character and the second player character. Thus, the player does not feel that the first player character does not sufficiently perform a role in a progress of the game, and the interest of the game can be increased.

In the second embodiment, each of the "computer apparatus", the "input device", the "first player character", the "second player character", the "action", the "automatic control of the action", and the "action setting" can employ contents disclosed in the first embodiment as necessary.

Third Embodiment

Next, a summary of a third embodiment of the present invention will be described. FIG. 1 is a block diagram illustrating the configuration of the computer apparatus corresponding to at least one embodiment of the present invention. The computer apparatus 1 includes the input device. The computer apparatus 1 includes at least the manual control unit 101, the first automatic control unit 102, the control switching unit 103, and the second automatic control unit 104.

The manual control unit 101 controls the action of the first player character in accordance with the operation of the player. The first automatic control unit 102 performs an automatic control of the action of the first player character. The control switching unit 103 switches between the control performed by the manual control unit 101 and the control performed by the first automatic control unit 102. The second automatic control unit 104 performs an automatic control of the action of the second player character that acts as the ally of the first player character. The automatic control performed by the first automatic control unit 102 is executed based on different action setting from the automatic control performed by the second automatic control unit 104. The action setting of the automatic control performed by the first automatic control unit 102 causes the first player character to act to satisfy a first predetermined condition. The action setting of the automatic control performed by the second automatic control unit 104 causes the second player character to act to not satisfy the first predetermined condition or causes the second player character to act regardless of whether or not to satisfy the predetermined condition.

Next, the program execution process in the third embodiment of the present invention will be described. FIG. 2 is a flowchart of the program execution process corresponding to at least one embodiment of the present invention. The computer apparatus 1 controls the action of the first player character in accordance with the operation of the player (step S1). The action of the first player character is subjected to the automatic control (step S2). Switching is performed between the control performed by the manual control unit 101 and the control performed by the first automatic control unit 102 (step S3). The action of the second player character acting as the ally of the first player character is subjected to the automatic control (step S4). The automatic control performed by the first automatic control unit 102 is executed based on different action setting from the automatic control performed by the second automatic control unit 104. The action setting of the automatic control performed by the first automatic control unit 102 causes the first player character to act to satisfy the first predetermined condition. The action setting of the automatic control performed by the second automatic control unit 104 causes the second player character to act to not satisfy the first predetermined condition or causes the second player character to act regardless of whether or not to satisfy the first predetermined condition.

As one aspect of the third embodiment, the first player character acts to satisfy the first predetermined condition, and the second player character acts not to satisfy the first predetermined condition. Thus, for example, in a case where the first predetermined condition is a condition for generating an advantageous effect for the first player character or the second player character, the player does not feel that the first player character does not sufficiently perform the role in the progress of the game, and the interest of the game can be increased.

In the third embodiment, each of the "computer apparatus", the "input device", the "first player character", the "second player character", the "action", the "automatic control of the action", and the "action setting" can employ the contents disclosed in the first embodiment as necessary.

In the third embodiment, the "first predetermined condition" is not particularly limited, provided that the first predetermined condition is a condition satisfiable in the progress of the game. For example, a condition for generating an advantageous effect for the first player character or the second player character is applied.

Fourth Embodiment

Next, a summary of a fourth embodiment of the present invention will be described. FIG. 1 is a block diagram illustrating the configuration of the computer apparatus corresponding to at least one embodiment of the present invention. The computer apparatus 1 includes the input device. The computer apparatus 1 includes at least the manual control unit 101, the first automatic control unit 102, the control switching unit 103, and the second automatic control unit 104.

The manual control unit 101 controls the action of the first player character in accordance with the operation of the player. The first automatic control unit 102 performs an automatic control of the action of the first player character. The control switching unit 103 switches between the control performed by the manual control unit 101 and the control performed by the first automatic control unit 102. The second automatic control unit 104 performs an automatic control of the action of the second player character that acts as the ally of the first player character. The automatic control performed by the first automatic control unit 102 is executed based on different action setting from the automatic control performed by the second automatic control unit 104. The action setting of the automatic control performed by the first automatic control unit 102 is set such that the action of the first player character varies depending on a type or a result of attack from an enemy character that acts as an enemy of the first player character and the second player character.

Next, the program execution process in the fourth embodiment of the present invention will be described. FIG. 2 is a flowchart of the program execution process corresponding to at least one embodiment of the present invention. The computer apparatus 1 controls the action of the first player character in accordance with an operation of the player (step S1). The action of the first player character is subjected to the automatic control (step S2). Switching is performed between the control performed by the manual control unit 101 and the control performed by the first automatic control unit 102 (step S3). The action of the second player character acting as the ally of the first player character is subjected to the automatic control (step S4). The automatic control performed by the first automatic control unit 102 is executed based on different action setting from the automatic control performed by the second automatic control unit 104. The action setting of the automatic control performed by the first automatic control unit 102 is set such that the action of the first player character varies depending on the type or the result of attack from the enemy character that acts as the enemy of the first player character and the second player character.

As one aspect of the fourth embodiment, the action of the first player character is set to vary depending on the type or the result of attack on the first player character from the enemy character that acts as the enemy of the first player character and the second player character. Thus, the first player character can be caused to execute the action corresponding to the type or the result of attack from the enemy character, and the interest of the game can be increased.

In the fourth embodiment, each of the "computer apparatus", the "input device", the "first player character", the "second player character", the "action", the "automatic control of the action", and the "action setting" can employ the contents disclosed in the first embodiment as necessary.

In the fourth embodiment, for example, the "enemy character" refers to a character that acts as the enemy of the first player character and the second player character. In the fourth embodiment, for example, the "attack" refers to an action of a character dealing damage to a character that is a battle opponent in a virtual battle, and includes not only attack using a weapon or a bare hand but also attack using a spell or an item. In the fourth embodiment, for example, the "type of attack" is a categorization of the attack in accordance with a content of the attack such as whether the attack is usual attack, special attack, or attack using the spell, or which content of the special attack or the attack using the spell corresponds to the attack. For example, the "result of attack" means a phenomenon or a situation that is caused by the attack and indicates which effect is received by the player character receiving the attack, or which state the player character receiving the attack falls into.

Fifth Embodiment

Next, a summary of a fifth embodiment of the present invention will be described. FIG. 1 is a block diagram illustrating the configuration of the computer apparatus corresponding to at least one embodiment of the present invention. The computer apparatus 1 includes the input device. The computer apparatus 1 includes at least the manual control unit 101, the first automatic control unit 102, the control switching unit 103, and the second automatic control unit 104.

The manual control unit 101 controls the action of the first player character in accordance with the operation of the player. The first automatic control unit 102 performs an automatic control of the action of the first player character. The control switching unit 103 switches between the control performed by the manual control unit 101 and the control performed by the first automatic control unit 102. The second automatic control unit 104 performs an automatic control of the action of the second player character that acts as the ally of the first player character. The automatic control performed by the first automatic control unit 102 is executed based on different action setting from the automatic control performed by the second automatic control unit 104. The action setting of the automatic control performed by the first automatic control unit 102 is set such that a frequency of attack on the enemy character acting as the enemy of the first player character and the second player character is increased, compared to the action setting of the automatic control performed by the second automatic control unit 104.

Next, the program execution process in the fifth embodiment of the present invention will be described. FIG. 2 is a flowchart of the program execution process corresponding to at least one embodiment of the present invention. The computer apparatus 1 controls the action of the first player character in accordance with the operation of the player (step S1). The action of the first player character is subjected to the automatic control (step S2). Switching is performed between the control performed by the manual control unit 101 and the control performed by the first automatic control unit 102 (step S3). The action of the second player character acting as the ally of the first player character is subjected to the automatic control (step S4). The automatic control performed by the first automatic control unit 102 is executed based on different action setting from the automatic control performed by the second automatic control unit 104. The action setting of the automatic control performed by the first automatic control unit 102 is set such that the frequency of attack on the enemy character acting as the enemy of the first player character and the second player character is increased, compared to the action setting of the automatic control performed by the second automatic control unit 104.

As one aspect of the fifth embodiment, the first player character attacks the enemy character with a higher frequency than the second player character. Thus, the player does not feel that the first player character does not sufficiently attack the enemy character, and the interest of the game can be increased.

In the fifth embodiment, each of the "computer apparatus", the "input device", the "first player character", the "second player character", the "action", the "automatic control of the action", and the "action setting" can employ the contents disclosed in the first embodiment as necessary. In the fifth embodiment, the "enemy character" and the "attack" can employ contents disclosed in the fourth embodiment as necessary.

Sixth Embodiment

Next, a summary of a sixth embodiment of the present invention will be described. FIG. 1 is a block diagram illustrating the configuration of the computer apparatus corresponding to at least one embodiment of the present invention. The computer apparatus 1 includes the input device. The computer apparatus 1 includes at least the manual control unit 101, the first automatic control unit 102, the control switching unit 103, and the second automatic control unit 104.

The manual control unit 101 controls the action of the first player character in accordance with the operation of the player. The first automatic control unit 102 performs an automatic control of the action of the first player character. The control switching unit 103 switches between the control performed by the manual control unit 101 and the control performed by the first automatic control unit 102. The second automatic control unit 104 performs an automatic control of the action of the second player character that acts as the ally of the first player character. The automatic control performed by the first automatic control unit 102 is executed based on different action setting from the automatic control performed by the second automatic control unit 104. The action setting of the automatic control performed by the first automatic control unit 102 is set such that the number of times of consecutive attack in a case of consecutively attacking the enemy character acting as the enemy of the first player character and the second player character is increased, compared to the action setting of the automatic control performed by the second automatic control unit 104.

Next, the program execution process in the sixth embodiment of the present invention will be described. FIG. 2 is a flowchart of the program execution process corresponding to at least one embodiment of the present invention. The computer apparatus 1 controls the action of the first player character in accordance with an operation of the player (step S1). The action of the first player character is subjected to the automatic control (step S2). Switching is performed between the control performed by the manual control unit 101 and the control performed by the first automatic control unit 102 (step S3). The action of the second player character acting as the ally of the first player character is subjected to the automatic control (step S4). The automatic control performed by the first automatic control unit 102 is executed based on different action setting from the automatic control performed by the second automatic control unit 104. The action setting of the automatic control performed by the first automatic control unit 102 is set such that the number of times of consecutive attack in a case of consecutively attacking the enemy character acting as the enemy of the first player character and the second player character is increased, compared to the action setting of the automatic control performed by the second automatic control unit 104.

As one aspect of the sixth embodiment, the number of times of consecutive attack in a case of consecutively attacking the enemy character is set to be higher for the first player character than for the second player character. Thus, the player does not feel that the first player character does not sufficiently attack the enemy character, and the interest of the game can be increased.

In the sixth embodiment, each of the "computer apparatus", the "input device", the "first player character", the "second player character", the "action", the "automatic control of the action", and the "action setting" can employ the contents disclosed in the first embodiment as necessary. In the sixth embodiment, the "enemy character" and the "attack" can employ the contents disclosed in the fourth embodiment as necessary.

Seventh Embodiment

Next, a summary of a seventh embodiment of the present invention will be described. FIG. 3 is a block diagram illustrating a configuration of the computer apparatus corresponding to at least one embodiment of the present invention. The computer apparatus 1 includes a control unit 11, a random access memory (RAM) 12, a storage unit 13, a sound processing unit 14, a graphics processing unit 15, a DVD/CD-ROM drive 16, a communication interface 17, and an interface unit 18 that are connected to each other through an internal bus.

The control unit 11 is configured with a central processing unit (CPU) and a read only memory (ROM). The control unit 11 controls the computer apparatus 1 by executing a program stored in the storage unit 13. The RAM 12 is a work area of the control unit 11. The storage unit 13 is a storage region for storing a game program and data.

The control unit 11 reads and processes the game program and the data from the RAM 12. By processing the game program and the data loaded in the RAM 12, the control unit 11 outputs a sound output instruction to the sound processing unit 14 and outputs a drawing command to the graphics processing unit 15.

The sound processing unit 14 is connected to a sound output apparatus 20 that is a speaker. In a case where the control unit 11 outputs the sound output instruction to the sound processing unit 14, the sound processing unit 14 outputs a sound signal to the sound output apparatus 20.

The graphics processing unit 15 is connected to a display unit 21. The display unit 21 has a display screen 22. In a case where the control unit 11 outputs the drawing command to the graphics processing unit 15, the graphics processing unit 15 loads an image into a video memory (frame buffer) 19 and outputs a video signal for displaying the image on the display screen 22.

The graphics processing unit 15 executes drawing of one image in units of frames. For example, a time period of one frame of the image is 1/30 second. The graphics processing unit 15 has a role of distributing a load of the entire system by taking charge of a part of a computation process related to drawing performed by only the control unit 11.

A recording medium 23 such as a DVD-ROM or a CD-ROM storing the game program can be mounted on the DVD/CD-ROM drive 16. The program and the data for performing the game in a video game apparatus are stored in the recording medium 23. The program and the data are read by the DVD/CD-ROM drive 16 and loaded into the RAM 12.

An external memory 24 (for example, an SD card) and an input unit 25 may be connected to the interface unit 18. Data read from the external memory 24 and input information input in the input unit 25 are loaded into the RAM 12 and are subjected to a computation process executed by the control unit 11.

The communication interface 17 can connect to a communication network 2 in a wireless or wired manner and can receive data through the communication network 2. Data received through the communication interface 17 is loaded into the RAM 12 and is subjected to the computation process performed by the control unit 11.

Figure 4:
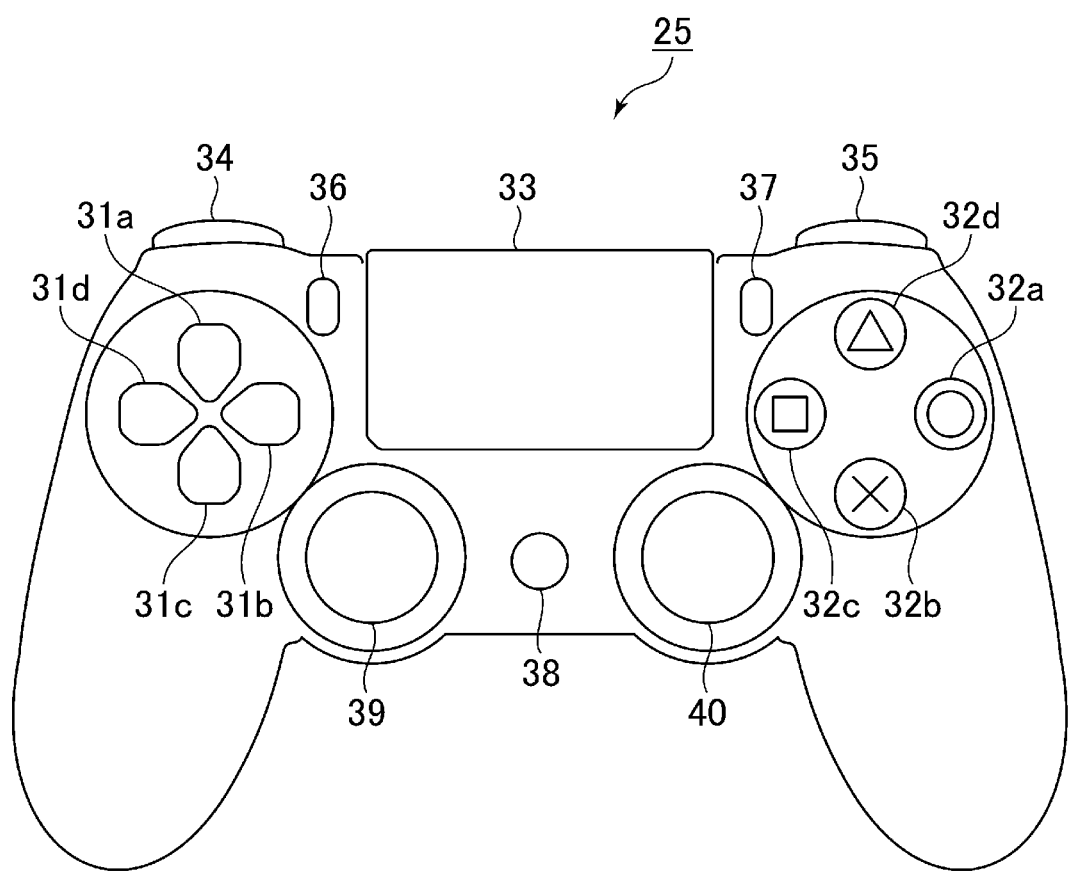
FIG. 4 is a diagram illustrating a configuration of the input unit corresponding to at least one embodiment of the present invention.

FIG. 4 is a diagram illustrating a configuration of the input unit corresponding to at least one embodiment of the present invention. A cross key 31 is disposed on a front left side of the input unit 25, and a button group 32 is disposed on a right side of the input unit 25. The cross key 31 includes an upward key 31a, a rightward key 31b, a downward key 31c, and a leftward key 31d. The button group 32 includes a ○ button 32a, a x button 32b, a □ button 32c, and a ∆ button 32d. In addition, a pad button 33 is disposed in a center portion of the input unit 25. A share button 36 is disposed on a left side of the pad button 33. An option button 37 is disposed on a right side of the pad button 33. A start button 38 is disposed at a center below the pad button 33. Furthermore, a plurality of buttons such as an L button 34 and an R button 35 are disposed in a side portion of the input unit

25. In addition, a joystick 39 is disposed on a lower right side of the cross key 31 on the front left side of the input unit 25. A joystick 40 is disposed on a lower left side of the button group 32 on a front right side of the input unit 25.

In a case where a pressing force is applied to each button of the cross key 31, the button group 32, the pad button 33, the L button 34, the R button 35, the share button 36, the option button 37, and the start button 38, a corresponding switch is switched ON. A detection signal corresponding to ON/OFF of the switch is generated in the input unit 25, and the detection signal is supplied to the RAM 12 through the interface unit 18. In addition, detection signals corresponding to inclination azimuths of the joystick 39 and the joystick 40 are generated in the input unit 25, and in the same manner, the detection signals are supplied to the RAM 12 through the interface unit 18.

Hereinafter, a case where the game program according to at least one embodiment of the present invention is applied to an action RPG will be described. The player character can move on a field inside a virtual space. In a case where the player character encounters the enemy character on the field, a virtual battle between the player character and the enemy character is started. The virtual battle progresses in real time along with an elapse of time. For an advantageous progress in the virtual battle, the player character can move close to the enemy character or away from the enemy character depending on a situation.

A hit point (HP) that indicates a remaining amount of physical strength is set for each of the player character and the enemy character. In a case where the HP becomes zero due to attack or the like of the opponent character, the character falls into a state of inability to battle. In a case where the HP of the enemy character becomes zero, the player character wins in the virtual battle, and the player character acquires an experience value and in-game money. Meanwhile, in a case where the HP of the player character becomes zero, the player character falls into the state of inability to battle, and the game is over. Alternatively, in a case where the player can operate a plurality of player characters, the virtual battle can be continued by operating the remaining player characters.

An operation method of the buttons and the joysticks of the input unit 25 described below is one example, and the player can appropriately change the buttons, the joysticks, and setting of corresponding actions.

The player can move the first player character, which is the operation target, on the field inside the virtual space by operating the joystick 39. In addition, the player can control a position, an attitude, and/or a field of view or the like of a virtual camera by operating the joystick 40. Furthermore, the joystick 40 not only operates by inclining the stick. In a case where any of an object inside the virtual space, the enemy character, or the second player character which is the ally and a target of the automatic control performed by the control unit 11 is set as a target of the action such as the attack performed by the first player character, this target can be "locked on" (fixed) by pressing the joystick 40 into a main body side of the input unit 25. In a case where the target is locked on by pressing the joystick 40, the locked-on target can be released by pressing the joystick 40 again.

In the virtual battle, in a case where the player presses the □ button 32c, close-range attack can be performed using the weapon such as a sword. In addition, long-range attack with a gun or the like can be consecutively performed by pressing the □ button 32c long.

The first player character can perform a dodging behavior against the attack of the enemy character. In a case where the player presses the ○ button 32a, the first player character can perform the dodging behavior by moving in any of upward, downward, leftward, and rightward directions.

The player can cause the first player character to take a defensive posture by pressing the R button 35. While the HP decreases in a case of receiving the attack of the enemy character in the defensive posture, an amount of decrease in HP is smaller than in a case of receiving the attack of the enemy attack not in the defensive posture.

The player can operate a plurality of characters by switching between the plurality of characters. The second player character that is subjected to the automatic control can be switched as the first player character by pressing the upward key 31a and the downward key 31c of the cross key 31.

In a case where the player presses the x button 32b, a command menu is displayed, and a transition is made to a tactical mode. In the tactical mode, an action to be executed by the first player character can be selected from a plurality of commands. After the command menu is displayed, the tactical mode continues until the command menu is closed by selecting the command.

In the tactical mode, time in the game elapses slowly. More specifically, a speed of movement or action of the player character, the automatically controlled character as the ally of the player character, the enemy character, or the like is decreased. In addition, as will be described later, in a case where a predetermined parameter increases along with the elapse of time, a speed of increase in the parameter is also decreased.

Three commands including an "ability", a "spell", and an "item" are displayed in the command menu. The player can select the action to be executed by the first player character by designating a command by operating the cross key 31 or the joystick 39 and pressing the ○ button 32a.

In a case where the player presses the A button 32d, switching can be performed between a "usual mode" and a "brave mode". In the "usual mode", a movement speed of the player character is higher than in the "brave mode". Meanwhile, in the "brave mode", the movement speed of the player character is decreased. However, unlike the "usual mode", a speed of sword fighting in a case of attacking with a sword is increased, and attack that is more powerful than in the "usual mode" can be consecutively repeated.

The first player character is a character which is the operation target of the player. The action of the first player character such as the movement or the behavior can be manually controlled by the operation of the player. In addition, as will be described later, the action of the first player character can be switched from the manual control to the automatic control and can be switched from the automatic control to the manual control.

The second player character is a character that is not the operation target of the player and acts as the ally of the first player character. The first player character and the second player character are a so-called "party" and progress in the game in cooperation with each other. The first player character and the second player character can be switched by the operation of the player. That is, a player character A can be switched from the first player character that can also be manually controlled, to the second player character that cannot be manually controlled. When the player character A is the first player character, a player character B that is the second player character which cannot be manually controlled can be switched to the first player character which can also be manually controlled.

A position and a direction of a viewpoint of the virtual camera are automatically controlled to follow the first player character by the control unit 11. In a case where the first player character and the second player character are switched by the operation of the player, the position and the direction of the viewpoint of the virtual camera are also automatically switched. A state of the inside of the virtual space captured by the virtual camera is displayed on the display screen 22 as a two-dimensional image by perspective transformation. The position and the direction of the viewpoint of the virtual camera can also be manually controlled.

While contents of the action setting of the automatic control of the first player character and the action setting of the automatic control of the second player character are not particularly limited, the automatic control of the first player character is executed based on different action setting from the automatic control of the second player character. The action of the player character is subjected to the automatic control in accordance with a predetermined program for controlling the action of the player character.

Figure 5:
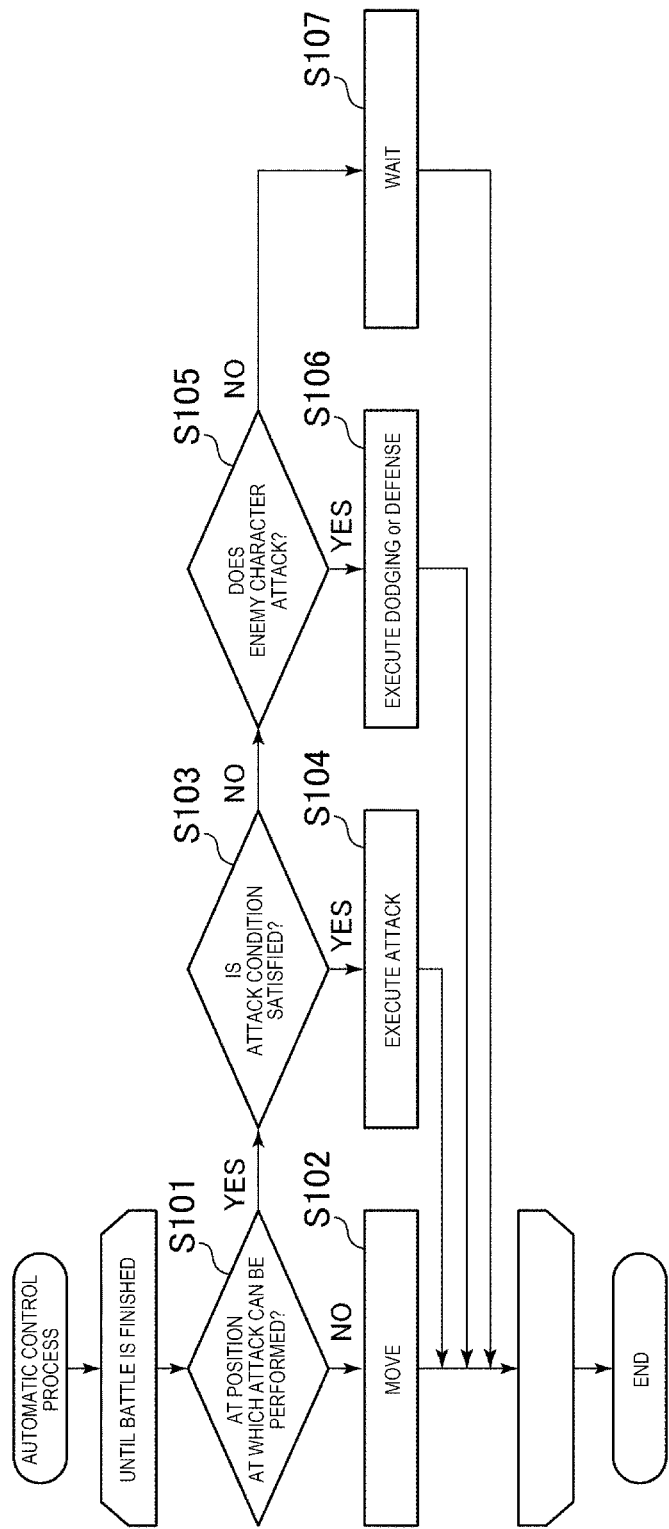
FIG. 5 is a flowchart of the program execution process corresponding to at least one embodiment of the present invention.

Next, an automatic control process for the first player character will be described. FIG. 5 is a flowchart of the program execution process corresponding to at least one embodiment of the present invention. The following processes of steps S101 to S107 are repeatedly executed for each frame until the battle is finished.

First, a determination as to whether or not the first player character is present at a position at which the enemy character can be attacked is performed (step S101). In a case where a plurality of enemy characters are present on the game field, a determination that the first player character is present at the position at which the enemy character can be attacked is made in a case where the first player character is present at a position at which one of the plurality of enemy characters can be attacked. In a case where the enemy character as a target of attack is "locked on", a determination as to whether or not the first player character is present at a position at which the "locked-on" enemy character can be attacked is performed in step S101.

In a case where the first player character is present away from the enemy character outside a range of attack (No in step S101), the first player character moves close to the enemy character (step S102). In a case where the first player character is present at the position at which the enemy character can be attacked (Yes in step S101), a determination as to whether or not an attack condition is satisfied is performed (step S103). Whether or not the attack condition is satisfied is determined based on the predetermined program for performing the automatic control of the action of the first player character or the parameter used for computation of the program.

In a case where a determination that the attack condition is satisfied is made (Yes in step S103), the attack is executed (step S104). Which attack method is to be executed among attack methods executable by the first player character is decided based on the predetermined program for performing the automatic control of the action of the first player character. In a case where a determination that the attack condition is not satisfied is made (No in step S103), a determination as to whether or not the attack on the first player character from the enemy character is stared is performed (step S105).

For example, the determination as to whether or not the attack condition is satisfied in step S103 is performed based on whether or not a predetermined time period elapses from execution of the previous attack, whether or not an upper limit of the number of times of consecutive attack (number of combos described later) is not exceeded, whether or not the attack is performed on the first player character from the enemy character, or whether or not a magic point necessary for the attack is present.

In a case where a determination that the attack on the first player character from the enemy character is started is made (Yes in step S105), dodging or defense is executed by the first player character (step S106). In step S106, whether to execute dodging or defense is decided based on the type of attack from the enemy character, a distance between the first player character and the enemy character, and the like. Meanwhile, in a case where a determination that the attack on the first player character from the enemy character is not started is made (No in step S105), the first player character does not execute any particular action and waits at the position (step S107).

While the contents of the action setting of the automatic control of the first player character and the action setting of the automatic control of the second player character are not particularly limited, the automatic control of the first player character is executed based on different action setting from the automatic control of the second player character.

The automatic control of the second player character is executed by processes of steps S101 to S107 illustrated in FIG. 5. However, the actions of the first player character and the second player character are controlled by different programs. Alternatively, even in a case where the program is the same, different parameters are used as the parameter in a case of computing the program. The action of the enemy character is also automatically controlled by the control unit 11.

In a case where, in the same manner as the first player character, the action of the second player character is subjected to the automatic control to sufficiently perform a role in the progress of the game such that the second player character sufficiently attacks the enemy character, the player character can easily win against the enemy character. A difficulty level of the game is decreased, and the interest may be decreased. Therefore, the action setting of the automatic control of the first player character can cause the first player character to act advantageously for the first player character and the second player character in the progress of the game, compared to the action setting of the automatic control of the second player character.

However, in a case where the content of the automatic control is restricted to a certain degree not causing the game to become excessively simple, and where the action of the first player character followed by the virtual camera is also excessively restricted, a satisfaction level of the player with respect to the automatic control may be decreased. Therefore, mainly, it is configured that the automatic control of the first player character displayed on a game screen is appropriately performed to a degree not disturbing the player, and that the automatic control of the second player character not followed by the virtual camera is restricted more than the first player character. By doing so, it is possible to reduce a possibility of the player being not satisfied with the automatic control, while preventing the game from becoming excessively simple.

As the action setting of the automatic control of the first player character and the action setting of the automatic control of the second player character, for example, the first player character can be caused to act to satisfy the first predetermined condition, and the second player character can be caused to act to not satisfy the first predetermined condition. Alternatively, the second player character can be caused to act regardless of whether or not to satisfy the first predetermined condition. While the first predetermined condition is not particularly limited, for example, the first predetermined condition can be set such that the HP (physical strength) of the enemy character becomes "0".

In a case where the first player character consecutively attacks the enemy character, the action of the first player character can be controlled to repeat the attack consecutively until the HP of the enemy character becomes "0". Meanwhile, in a case where the second player character consecutively attacks the enemy character, the second player character can be controlled to stop the consecutive attack before the HP of the enemy character becomes "0". Alternatively, in a case where the second player character consecutively attacks the enemy character, the action of the second player character can be controlled in accordance with the predetermined program regardless of whether or not the HP of the enemy character becomes "0", even in a case where the second player character continues the consecutive attack on the enemy character.

As the action setting of the automatic control of the first player character, for example, the action of the first player character can be set to vary depending on the type of attack from the enemy character. Meanwhile, such setting may not be set as the action setting of the automatic control of the second player character. Usually, in a case where the enemy character attacks, the player character is subjected to the automatic control to dodge or defend against the attack. However, in a case where the first player character consecutively attacks the enemy character, causing the first player character to continue the attack without dodging or defending against the attack of the enemy character may be advantageous for the first player character when the attack of the enemy character is not powerful.

Therefore, for example, in a case where the attack from the enemy character is the usual attack, the first player character can be controlled to execute the attack on the enemy character without dodging or defending against the attack from the enemy character. Meanwhile, in a case where the attack from the enemy character is powerful attack such as the special attack, the first player character can be controlled to dodge or defend against the attack from the enemy character without attacking the enemy character.

As the action setting of the automatic control of the first player character, for example, the action of the first player character can be set to vary depending on the result of attack from the enemy character. Meanwhile, such setting may not be set as the action setting of the automatic control of the second player character. Usually, in a case where the enemy character attacks, the player character is subjected to the automatic control to dodge or defend against the attack.

However, in a case where the first player character consecutively attacks the enemy character, causing the first player character to continue the attack without dodging or defending against the attack of the enemy character may achieve a better result for the first player character when the result of attack of the enemy character is not significantly disadvantageous for the first player character.

Therefore, for example, in a case where the first player character simply receives damage as a result of attack from the enemy character, the first player character can be controlled to execute the attack on the enemy character without dodging or defending against the attack from the enemy character. Meanwhile, in a case where the first player character not only receives damage but also is blown away by the attack in a case of receiving the attack from the enemy character, the first player character can be controlled to dodge or defend against the attack from the enemy character without attacking the enemy character.

A method of adding a predetermined point each time the first player character or the second player character receives the attack of the enemy character, and in a case where the added point reaches a threshold value, causing the first player character or the second player character to not only receive damage but also be blown away can be used.

As the action setting of the automatic control of the first player character and the action setting of the automatic control of the second player character, for example, the frequency of attacking the enemy character can be set to be higher for the first player character than for the second player character. More specifically, in a case where the first player character and the second player character are under the same condition, the first player character can be set to execute the attack on the enemy character a larger number of times than the second player character within the same time period, such that in a case where the player character is at a distance at which the player character can attack the enemy character, the first player character attacks the enemy character 10 times, and the second player character attacks the enemy character only two times.

As the action setting of the automatic control of the first player character and the action setting of the automatic control of the second player character, for example, the number of times of consecutive attack can be set to be larger for the first player character than for the second player character in a case where the player character consecutively attacks the enemy character. More specifically, the first player character can be set to attack the enemy character five consecutive times, and the second player character can be set to attack the enemy character only two consecutive times. In addition, an upper limit or a lower limit of the number of times of consecutive attack can be set for each of the first player character and the second player character.

The consecutive attack on the enemy character by the player character is a so-called "combo". In a case where the attack hits the enemy character without a miss, the number of combos which is the number of times of consecutive attack is increased by one. In a case where the attack does not hit the enemy character, the number of combos accumulated thus far can be reset and return to "0". As the number of combos is increased, an effect of attack of the player character can be increased, or the in-game money, the experience value, or other points that can be obtained by the player character can be increased.

Figure 6:
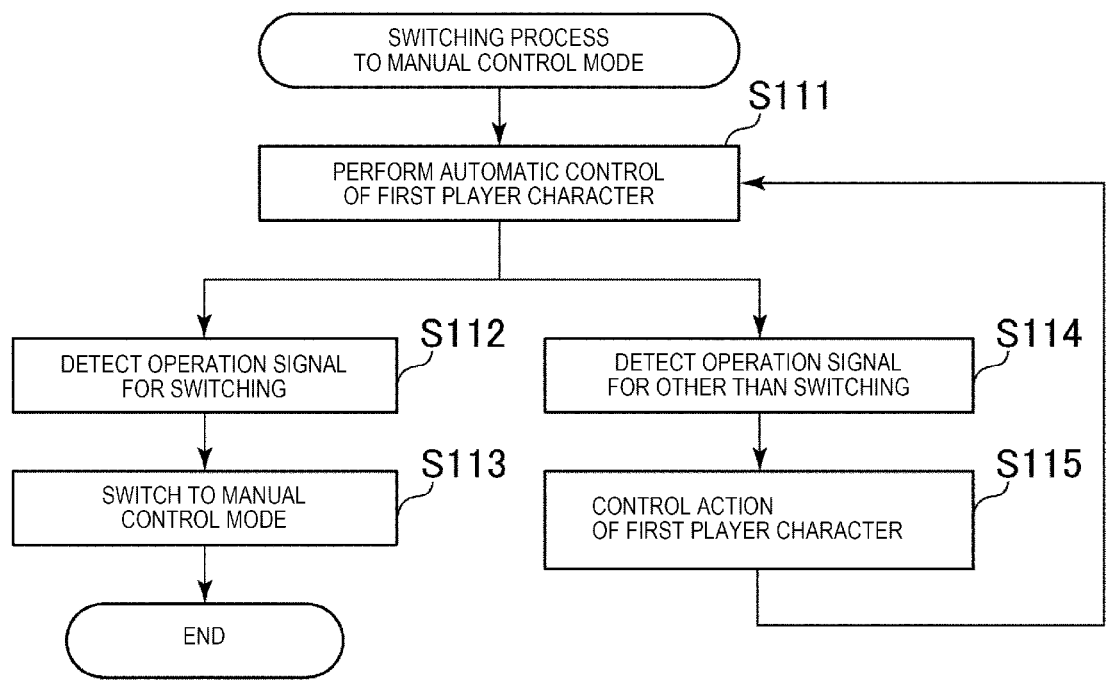
FIG. 6 is a flowchart of the switching process from the automatic control mode to the manual control mode corresponding to at least one embodiment of the present invention.

Next, a switching process from an automatic control mode to a manual control mode in the seventh embodiment of the present invention will be described. FIG. 6 is a flowchart of the switching process from the automatic control mode to the manual control mode corresponding to at least one embodiment of the present invention. The switching process is executed by the CPU of the computer apparatus 1.

In a state where the action of the first player character is subjected to the automatic control (step S111), an operation signal for controlling the action of the first player character is detected. In a case where an operation signal as a trigger for switching from the automatic control mode to the manual control mode is detected from the input device (step S112), switching is performed from the automatic control mode to the manual control mode (step S113). The action of the first player character is subjected to a manual control in accordance with the operation signal detected in step S112. The switching process from the automatic control mode to the manual control mode is finished through step S113.

Operations for controlling the action of the first player character include the movement of the player character using the joystick 39, the close-range attack using the □ button 32c, the dodging behavior using the ○ button 32a, the defensive posture using the R button 35, command selection in the tactical mode using the x button 32b, and switching between the "usual mode" and the "brave mode" using the A button 32d. A part of the operations can be an operation as the trigger for switching from the automatic control mode to the manual control mode in step S113.

For example, a method of setting, among the operations for controlling the action of the first player character, the movement of the first player character using the joystick 39 as the operation as the trigger for switching from the automatic control mode to the manual control mode in step S113, and not setting the other operations as the operation for switching to the manual control mode can be used. Alternatively, a method of setting the close-range attack using the □ button 32c as the operation as the trigger for switching from the automatic control mode to the manual control mode in step S113, and not setting the other operations as the operation for switching to the manual control mode can be used.

Meanwhile, in a case where the detected operation signal is an operation signal other than the operation signal as the trigger for switching from the automatic control mode to the manual control mode (step S114), the action of the first player character is controlled in accordance with the detected operation signal (step S115). Then, a return is made to step S111, and the action of the first player character is controlled in the automatic control mode.

For example, the operation of switching between the "usual mode" and the "brave mode" using the A button 32d can be set as the operation signal other than the operation signal as the trigger for switching from the automatic control mode to the manual control mode in step S114. In this case, the action of the first player character is subjected to the automatic control in the "brave mode" after switching is performed from the "usual mode" to the "brave mode" in step S115.

Figure 7:
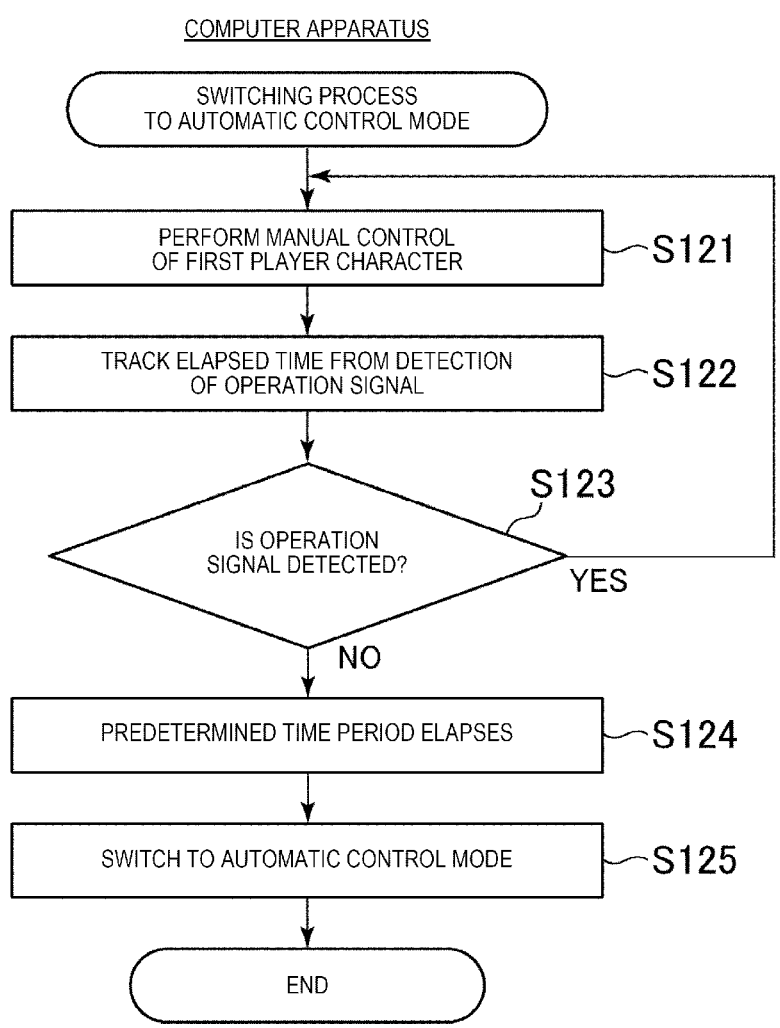
FIG. 7 is a flowchart of the switching process from the manual control mode to the automatic control mode corresponding to at least one embodiment of the present invention.

Next, a switching process from the manual control mode to the automatic control mode in the seventh embodiment of the present invention will be described. FIG. 7 is a flowchart of the switching process from the manual control mode to the automatic control mode corresponding to at least one embodiment of the present invention.

In a state where the action of the first player character is subjected to the manual control (step S121), in a case where the operation signal based on the operation for controlling the action of the first player character is detected, the action of the first player character is controlled in accordance with the detected operation signal.

In a case where the operation signal based on the operation for controlling the action of the first player character is not detected, elapsed time from detection of the last operation signal is tracked (step S122). In a case where the operation signal based on the operation for controlling the action of the first player character is detected before the elapsed time reaches a predetermined time period (Yes in step S123), a return is made to step S121. Meanwhile, in a case where the operation signal is not detected (No in step S123), and the elapsed time reaches the predetermined time period (step S124), switching is executed from the manual control mode to the automatic control mode (step S125), and the process is finished.

The predetermined time period can be appropriately set. For example, a time period of 10 seconds can be set. In this case, a transition is made from the manual control mode to the automatic control mode in a case where the operation for controlling the action of the first player character is not performed for 10 seconds.

The automatic control of the action of the first player character in the automatic control mode is controlled in accordance with the predetermined program. The action of the first player character may be subjected to the automatic control by different programs depending on the operated character. For example, in a case of a character specialized in the close-range attack, the character can be controlled to move close to the enemy character as the target and mainly perform the close-range attack. In a case of a character specialized in a healing spell, the character can be mainly controlled to heal the ally character using the healing spell at a distance from the enemy character.

In a case where the target is locked on a specific character by pressing the joystick 40, the first player character is controlled to execute a predetermined action such as the attack or healing on the locked target. In the automatic control mode, the first player character is controlled to perform different actions depending on whether the locked target is the ally character or the enemy character.

In a case where the player presses the A button 32d, switching can be performed between the "usual mode" and the "brave mode". Even in a case where the player presses the A button 32d in a case where the action of the first player character is subjected to the automatic control in accordance with the predetermined program, switching is performed from the "usual mode" to the "brave mode", or switching is performed from the "brave mode" to the "usual mode", and the automatic control continues.

In the "usual mode", a movement speed and an action speed of the first player character are higher than in the "brave mode". Meanwhile, in the "brave mode", the movement speed and the action speed of the first player character are lower than in the "usual mode". However, more excellent effect of the action executed by the first player character can be achieved. Specifically, in the "brave mode", attack power of the first player character can be increased, compared to the "usual mode". By switching between the "usual mode" and the "brave mode" using the A button 32d, it is possible to appropriately change a manner of progress in the battle with the enemy character while continuing the automatic control.

Alternatively, in the "brave mode", while the movement speed and the action speed of the first player character are lower than in the "usual mode", a method of setting the type of action executable by the first player character to vary can be used. More specifically, while only the usual attack using the weapon such as the sword can be performed in the "usual mode", the special attack using the spell or the like can be performed in the "brave mode" in addition to the usual attack. By switching between the "usual mode" and the "brave mode" using the A button 32d, it is possible to change the type of action executable by the first player character while continuing the automatic control.

In a case where the plurality of enemy characters are present on the game field, the enemy character as the target of attack of the first player character can be selected and "locked on" by the operation of the player. In a case where a cursor is overlaid on the enemy character on the display screen 22, the enemy character on which the cursor is overlaid can be locked on by pressing the joystick 40 into the main body side of the input unit 25. In a case where the enemy character is locked on, the first player character attacks only the locked-on enemy character. In a case where the HP of the locked-on enemy character becomes "0" and the locked-on enemy character is defeated, a locked-on state is released.

The lock-on of the enemy character by the first player character effectively functions when the first player character is subjected to either the manual control or the automatic control. Accordingly, even in a case where the first player character is subjected to the automatic control, the automatic control can be performed to attack only a specific enemy character by locking on the enemy target. In addition, by releasing the lock-on of the enemy character, the automatic control can be performed to attack not only the specific enemy character but also the enemy character present at the position at which the first player character can attack.

In a case where the plurality of enemy characters are present on the game field, a mark that enables the enemy character as the target of attack of the first player character to be visually recognized among the enemy characters is displayed. The mark indicates the enemy character as the target of attack of the first player character among the enemy characters and is displayed in an overlaid manner on the enemy character as the target of attack. A shape or a form of the mark is not particularly limited.

In a case where the action of the first player character is subjected to the automatic control, the automatic control of the action of the first player character can be displayed in a visually recognizable form using this mark. Specifically, the player can easily perceive the automatic control of the action of the first player character by displaying a text "AUTO" on the mark.

The input unit 25 may have a vibration generation function for generating vibration that can be transmitted to the player holding the input unit 25. The vibration can be generated in a case where a second predetermined condition is satisfied in the progress of the game. While the second predetermined condition is not particularly limited, for example, the second predetermined condition can be set such that the attack of the first player character hits the enemy character, or that the attack of the enemy character hits the first player character. Alternatively, the second predetermined condition can be set such that a specific type of attack hits the first player character among types of attack of the enemy character.

Setting ON/OFF of the generation of the vibration in the input unit 25 can be performed in advance by the operation of the player. Setting ON/OFF of the generation of the vibration may be performed before play of the game is started, or may be performed by opening a menu screen or the like during the play of the game. However, even in a case where the generation of the vibration is set ON, and when the second predetermined condition is satisfied, the vibration may not be generated in a case where the first player character is subjected to the automatic control.

In a case where the first player character is subjected to the automatic control, the vibration may not be generated even when the second predetermined condition is satisfied. However, even in a case where the first player character is subjected to the automatic control, the vibration can be controlled to be generated in a case where the second predetermined condition is satisfied by executing the action selected in the tactical mode described above.

The difficulty level of the game can be selected by the operation of the player. The difficulty level may be selected before the play of the game is started, or may be selected by opening the menu screen or the like during the play of the game. As the difficulty level of the game, for example, a "hard mode", a "normal mode", an "easy mode", and a "classic mode" are prepared. The difficulty level is the highest in the "hard mode", and the difficulty level is decreased in an order of the "normal mode", the "easy mode", and the "classic mode".

The automatic control of the first player character can be executed in a case where any difficulty level is selected. In this case, the action setting for the automatic control of the first player character can be set to vary depending on the difficulty level. Alternatively, the automatic control of the first player character can be executed only in a case where a part of the difficulty levels is selected. For example, a method of enabling the automatic control of the first player character to be executed only in a case where the "classic mode" is selected can be used.

Figure 8:
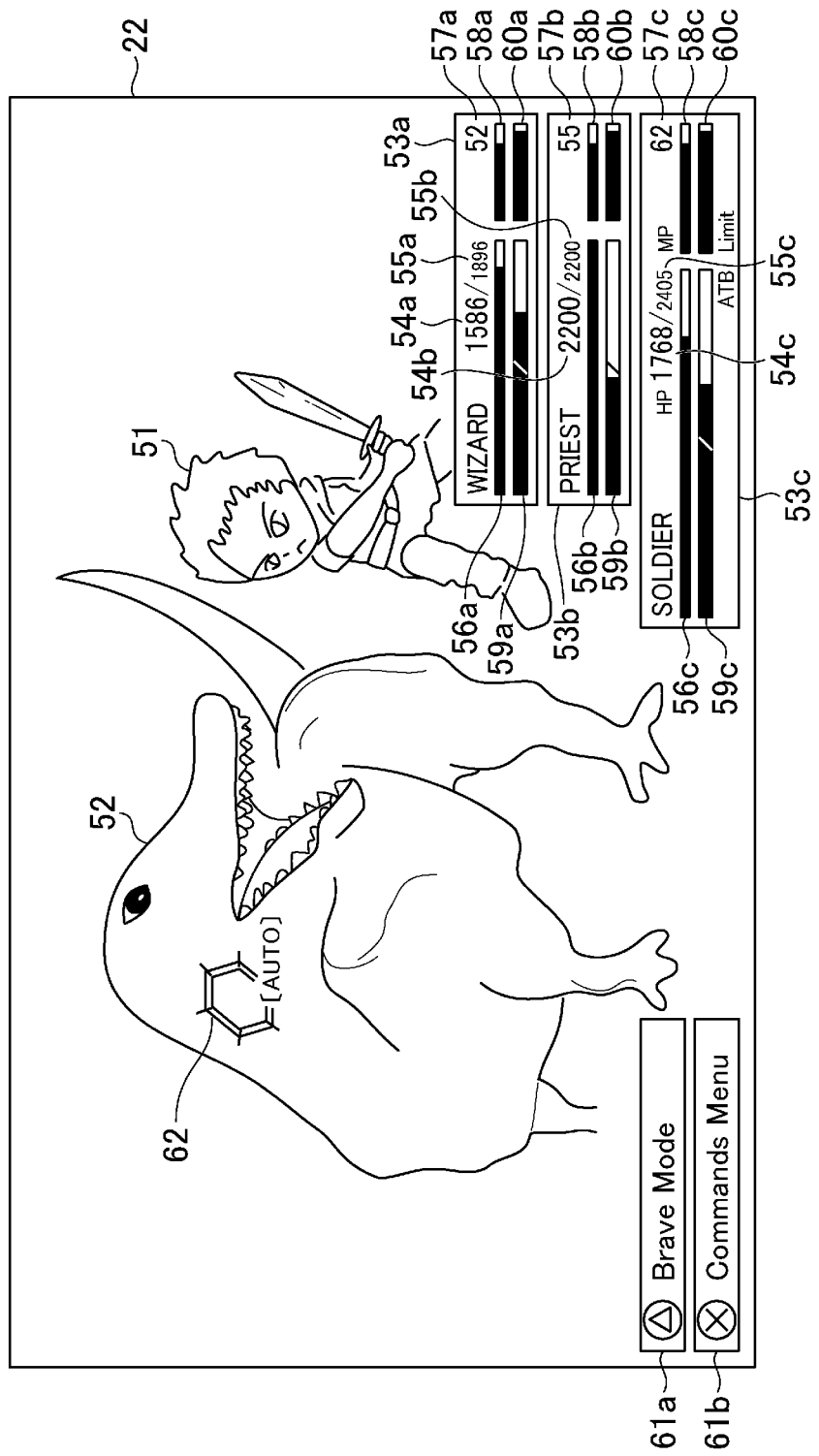
FIG. 8 is a diagram representing an example of a program execution screen corresponding to at least one embodiment of the present invention.

FIG. 8 is a diagram representing an example of a program execution screen corresponding to at least one embodiment of the present invention. In FIG. 8, a player character 51 and an enemy character 52 are displayed at a center of the display screen 22.

Status windows 53a to 53c are displayed on a lower right side of the display screen 22. Among the status windows 53a to 53c, the status window 53c that is present lowermost and has the largest area represents a status of the first player character 51 currently operated by the player. The status windows 53a and 53b represent a status of the second player character which is the ally of the first player character 51. In a case where the player character is switched, a status window 53 corresponding to the first player character 51 that becomes a new operation target is displayed in an enlarged manner.

In the status windows 53a to 53c, hit points 54a to 54c and maximum hit points 55a to 55c of the first player character 51 and the second player character which is the ally are displayed, and HP gauges 56a to 56c are displayed below the hit points 54a to 54c and the maximum hit points 55a to 55c. A colored part of an HP gauge 56 corresponds to a current hit point 54. Thus, in a case where the HP 54 of the first player character 51 becomes a maximum HP 55, the entire part of the HP gauge 56 is colored. Meanwhile, in a case where the HP 54 of the first player character 51 becomes "0", the colored part of the HP gauge 56 is removed, and the entire gauge becomes white.

In the status windows 53a to 53c, magic points 57a to 57c and MP gauges 58a to 58c are displayed. In a case where the player character 51 uses the spell, a numerical value displayed on a magic point 57 is subtracted in accordance with the used spell, and a boundary of a colored part of an MP gauge 58 is moved leftward.

In the status windows 53a to 53c, active time battle (ATB) gauges 59a to 59c are displayed. Colored parts of the ATB gauges 59a to 59c correspond to a current ATB parameter. In a case where the ATB parameter is increased along with the elapse of time, boundaries of the colored parts of the ATB gauges 59a to 59c are moved rightward. Each of the ATB gauges 59a to 59c is provided with a diagonal line at a center and is divided into two regions. While division is performed into two regions here, division can be performed into a plurality of regions more than or equal to two.

In a case where an action such as the ability, the spell, or the item is executed by consuming the ATB parameter, the ATB parameter corresponding to one region or two regions of an ATB gauge 59 is consumed. By using such a configuration of executing the action by consuming the ATB parameter corresponding to the equally divided regions of the ATB gauge, the player can easily perceive whether or not the player is in a state where a predetermined action can be executed, and how much time is to elapse in order to be capable of executing the predetermined action.

In the status windows 53a to 53c, limit gauges 60a to 60c are displayed. Colored parts of the limit gauges 60a to 60c correspond to a current limit parameter. Thus, in a case where the limit parameter is increased, boundaries of the colored parts of the limit gauges 60a to 60c are moved rightward. For example, a predetermined value is added to the limit parameter each time the attack of the player character hits the enemy character. In a case where the player character 51 executes a limit break, the entire limit parameter is consumed, and the colored parts of the limit gauges 60a to 60c become white. The limit break is performing significantly more powerful attack on the enemy character than usual.

In FIG. 8, commands 61a and 61b are displayed on a lower left side of the display screen 22. As displayed on the command 61a, in a case where the A button 32d of the input unit 25 is pressed, switching can be performed from the "usual mode" to the "brave mode". Meanwhile, as displayed on the command 61b, in a case where the x button 32b of the input unit 25 is pressed, the command menu is displayed. The command menu displays a plurality of commands, for example, the ability, the spell, and the item. The action to be executed by the first player character can be specified by selecting any command.

In a case where a command is selected in the command menu and the attack hits the enemy character, the vibration is generated in the input unit 25 even in a case where the first player character is subjected to the automatic control.

In a case where the enemy character 52 as the target of attack of the first player character is "locked on", a target mark 62 is displayed in an overlaid manner on the enemy character 52. In a case where the first player character is subjected to the automatic control, the text "AUTO" is displayed on a lower right side of the target mark 62, and the player can visually recognize an "AUTO mode" in which the first player character is subjected to the automatic control.

As one aspect of the seventh embodiment, a game program of high interest can be provided.

As one aspect of the seventh embodiment, the first player character is caused to act advantageously for the first player character and the second player character. Thus, the player does not feel that the first player character does not sufficiently perform the role in the progress of the game, and the interest of the game can be increased.

As one aspect of the seventh embodiment, the first player character acts to satisfy the first predetermined condition, and the second player character acts not to satisfy the first predetermined condition. Thus, for example, in a case where the first predetermined condition is a condition for generating an advantageous effect for the first player character or the second player character, the player does not feel that the first player character does not sufficiently perform the role in the progress of the game, and the interest of the game can be increased.

As one aspect of the seventh embodiment, the action of the first player character is set to vary depending on the type or the result of attack on the first player character from the enemy character that acts as the enemy of the first player character and the second player character. Thus, the first player character can be caused to execute the action corresponding to the type or the result of attack from the enemy character, and the interest of the game can be increased.

As one aspect of the seventh embodiment, the first player character attacks the enemy character with a higher frequency than the second player character. Thus, the player does not feel that the first player character does not sufficiently attack the enemy character, and the interest of the game can be increased.

As one aspect of the seventh embodiment, the number of times of consecutive attack in a case of consecutively attacking the enemy character is set to be higher for the first player character than for the second player character. Thus, the player does not feel that the first player character does not sufficiently attack the enemy character, and the interest of the game can be increased.

As one aspect of the seventh embodiment, the first player character can be switched to the second player character, and the second player character can be switched to the first player character by the operation of the player. Thus, since the player can appropriately select the player character, the interest of the game can be increased.

As one aspect of the seventh embodiment, in a case where the operation for controlling the action of the first player character is not performed, the action of the first player character is subjected to the automatic control. In a case where the operation for controlling the action of the first player character is performed, the action of the first player character is controlled in accordance with the operation. Thus, the automatic control and the manual control of the first player character can be switched using a simple method.

As one aspect of the seventh embodiment, in a case where the first player character is subjected to the automatic control, when one enemy character is selected by the operation of the player, the first player character is subjected to the automatic control to execute the attack on the selected enemy character. When the enemy character is not selected, the attack is executed on the enemy character on which the attack can be executed. Thus, even in a case of the automatic control, the player can select whether or not to target the enemy character.

As one aspect of the seventh embodiment, the mark which enables the enemy character as the target of attack of the first player character to be visually recognized is displayed. Furthermore, in a case where the action of the first player character is subjected to the automatic control, the mark is displayed in a manner that enables execution of the automatic control to be visually recognized. Thus, the player can easily visually recognize a state where the first player character is subjected to the automatic control.

As one aspect of the seventh embodiment, in a case where the action of the first player character is subjected to the automatic control, the virtual camera is automatically controlled. Thus, the player can progress in the game and check a progress situation of the game even without performing any operation.

As one aspect of the seventh embodiment, a plurality of states where the action speed of the first player character and the effect of the action executed by the first player character vary are provided, and the action of the first player character is subjected to the automatic control in accordance with a set state. Thus, the automatic control of the first player character can be changed.

As one aspect of the seventh embodiment, in a case where the first player character is subjected to the automatic control, the automatic control can be released only in a case where a predetermined operation button and/or a predetermined operation stick is operated among operation buttons and/or operation sticks set as the operation for controlling the action of the first player character.

As one aspect of the seventh embodiment, even in a case where the second predetermined condition for generating the vibration in the input device is satisfied, the vibration may not be generated in a case where the action of the first player character is subjected to the automatic control.

As one aspect of the seventh embodiment, even in a case where the vibration is set to be generated in a case where the second predetermined condition is satisfied, the vibration may not be generated in a case where the action of the first player character is subjected to the automatic control.

As one aspect of the seventh embodiment, in a case where the action of the first player character is subjected to the automatic control, the vibration is not generated even in a case where the second predetermined condition is satisfied. However, in a case of the automatic control, the vibration can be generated in a case where the second predetermined condition is satisfied by executing a predetermined action by the operation of the player.

As one aspect of the seventh embodiment, the difficulty level of the game can be selected by the operation of the player, and whether or not to execute the automatic control of the first player character can be switched in accordance with the selected difficulty level.

As one aspect of the seventh embodiment, a plurality of states where the action speed of the first player character and the type of action executed by the first player character vary are provided, and the action of the first player character is subjected to the automatic control in accordance with the set state. Thus, the automatic control of the first player character can be changed.

In the seventh embodiment, each of the "computer apparatus", the "input device", the "first player character", the "second player character", the "action", the "automatic control of the action", and the "action setting" can employ the contents disclosed in the first embodiment as necessary.

In the seventh embodiment, the "first predetermined condition" can employ contents disclosed in the third embodiment as necessary. In the seventh embodiment, the "enemy character", the "attack", the "type of attack", and the "result of attack" can employ the contents disclosed in the fourth embodiment as necessary.

In the seventh embodiment, the "mark" indicates the enemy character as the target of attack of the first player character among the enemy characters, and the shape or the form of the mark is not particularly limited.

In the seventh embodiment, for example, the "virtual camera" is a virtual camera for capturing the inside of the virtual space.

In the seventh embodiment, for example, the "action speed of the player character" refers to a speed at which the player character acts, and is exemplified by, for example, a speed (a walking speed or a running speed) at which the first player character moves inside the virtual space, or a speed of executing an action such as a speed at which the first player character swings the sword, or a speed at which the first player character casts the spell. In the seventh embodiment, the "effect of the action" refers to an effect generated as the result of the action of the first player character and is exemplified by, for example, damage by the attack or an attack spell or healing by the healing spell or a healing item.

In the seventh embodiment, for example, the "vibration" means continuous shakes that can be transmitted to the player holding the input device. For example, the "second predetermined condition" refers to a condition for generating the vibration in the input device.

In the seventh embodiment, for example, the "difficulty level of the game" means a degree of difficulty of the game.

Eighth Embodiment

Figure 9:
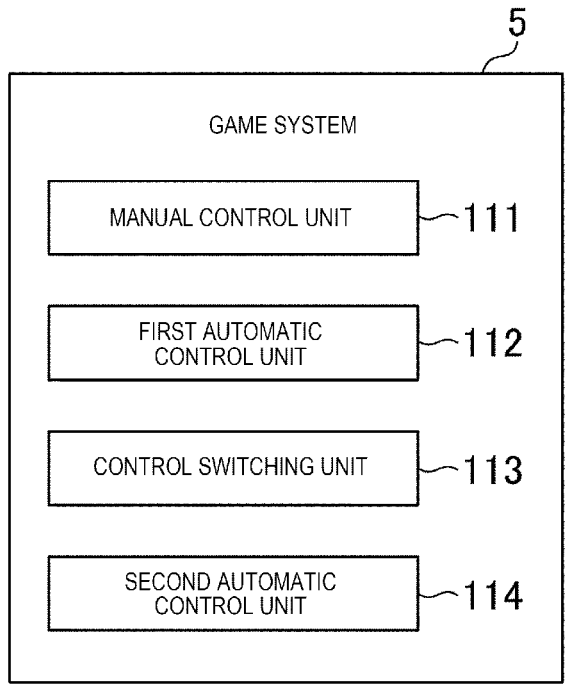
FIG. 9 is a block diagram illustrating a configuration of a game system corresponding to at least one embodiment of the present invention.

A summary of an eighth embodiment of the present invention will be described. FIG. 9 is a block diagram illustrating a configuration of a game system corresponding to at least one embodiment of the present invention. A game system 5 includes a terminal apparatus operated by the player and a server apparatus that can connect to and communicate with the terminal apparatus. The terminal apparatus includes the input device. The game system 5 includes at least a manual control unit 111, a first automatic control unit 112, a control switching unit 113, and a second automatic control unit 114.

The manual control unit 111 controls the action of the first player character in accordance with the operation of the player. The first automatic control unit 112 performs an automatic control of the action of the first player character. The control switching unit 113 switches between the control performed by the manual control unit 111 and the control performed by the first automatic control unit 112. The second automatic control unit 114 performs an automatic control of the action of the second player character that acts as the ally of the first player character. The automatic control performed by the first automatic control unit 112 is executed based on different action setting from the automatic control performed by the second automatic control unit 114.

Figure 10:
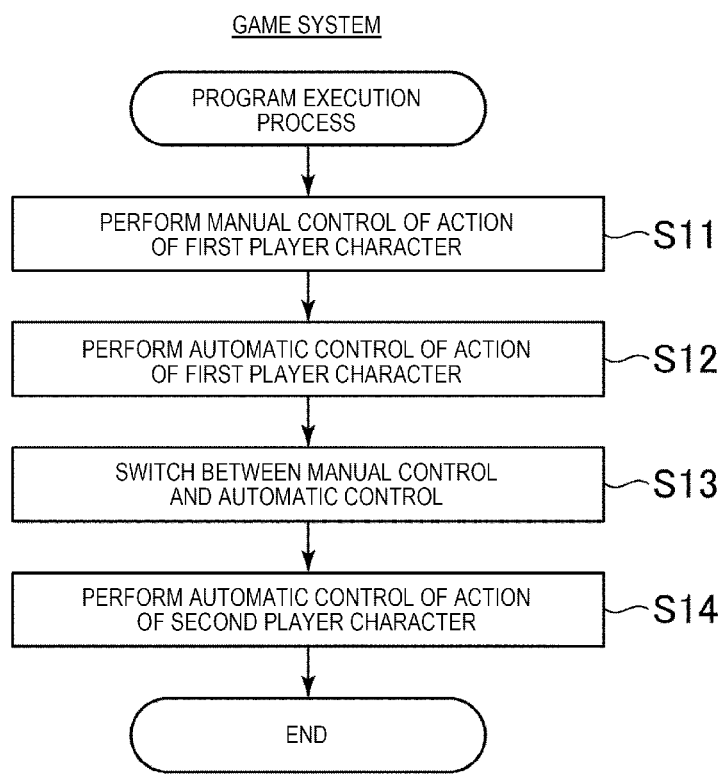
FIG. 10 is a flowchart of the program execution process corresponding to at least one embodiment of the present invention.

Next, the program execution process in the eighth embodiment of the present invention will be described. FIG. 10 is a flowchart of the program execution process corresponding to at least one embodiment of the present invention. The game system 5 controls the action of the first player character in accordance with the operation of the player (step S11). The action of the first player character is subjected to the automatic control (step S12). Switching is performed between the control performed by the manual control unit 111 and the control performed by the first automatic control unit 112 (step S13). The action of the second player character acting as the ally of the first player character is subjected to the automatic control (step S14). The automatic control performed by the first automatic control unit 112 is executed based on different action setting from the automatic control performed by the second automatic control unit 114.

As one aspect of the eighth embodiment, a game program of high interest can be provided.

In the eighth embodiment, each of the "computer apparatus", the "input device", the "first player character", the "second player character", the "action", the "automatic control of the action", and the "action setting" can employ the contents disclosed in the first embodiment as necessary.

Ninth Embodiment

Figure 11:
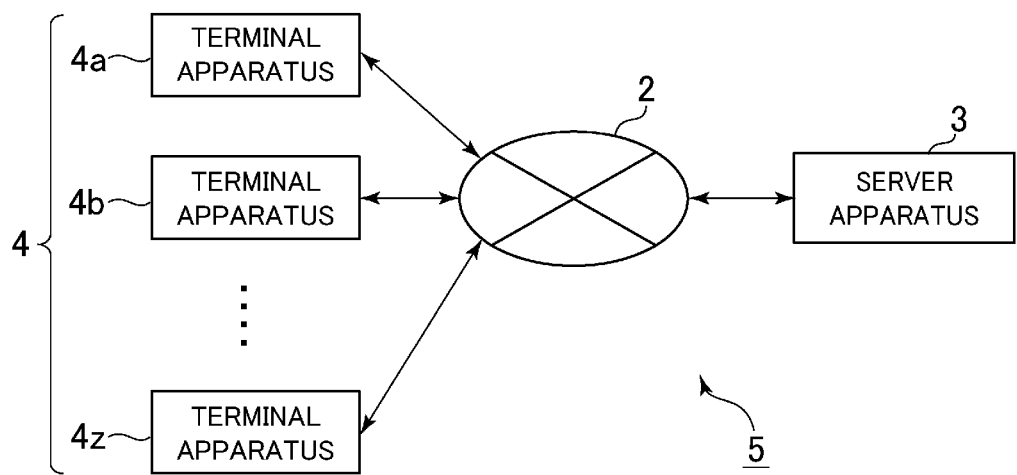
FIG. 11 is a block diagram illustrating a configuration of the game system corresponding to at least one embodiment of the present invention.

Next, a summary of a ninth embodiment of the present invention will be described. FIG. 11 is a block diagram illustrating a configuration of the game system corresponding to at least one embodiment of the present invention. As illustrated, the game system 5 is configured with a plurality of terminal apparatuses 4 (terminal apparatuses 4a, 4b, . . . , 4z) operated by a plurality of players (players A, B, . . . , Z), the communication network 2, and a server apparatus 3. The terminal apparatuses 4 are connected to the server apparatus 3 through the communication network 2. The terminal apparatuses 4 and the server apparatus 3 may not be connected at all times, and connection may be available as necessary. Each terminal apparatus 4 can employ the same configuration as the computer apparatus illustrated in FIG. 3. The input unit 25 of each terminal apparatus 4 can employ the same configuration as the input unit illustrated in FIG. 4.

Figure 12:
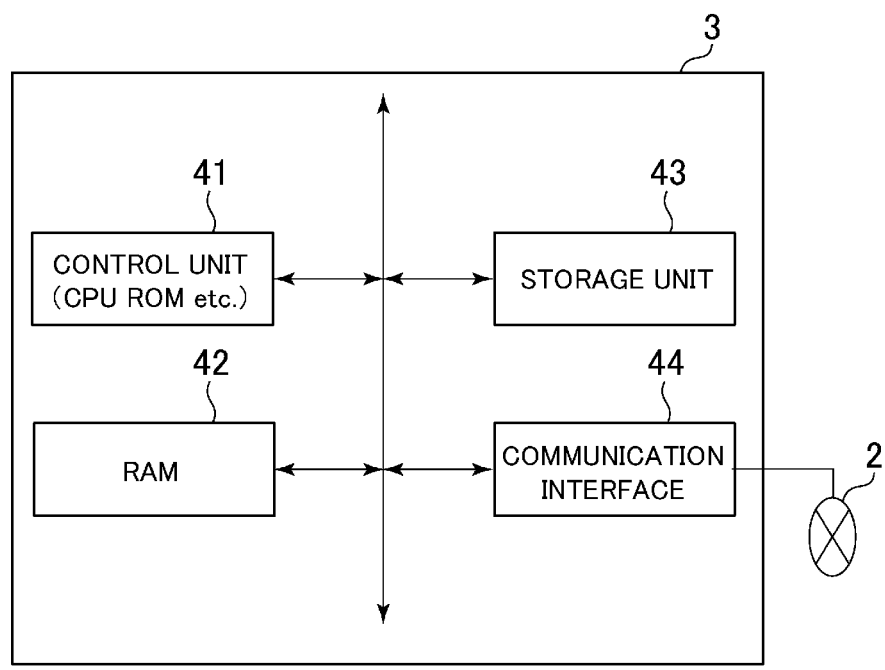
FIG. 12 is a block diagram illustrating a configuration of the server apparatus corresponding to at least one embodiment of the present invention.

FIG. 12 is a block diagram illustrating a configuration of the server apparatus corresponding to at least one embodiment of the present invention. The server apparatus 3 includes a control unit 41, a RAM 42, a storage unit 43, and a communication interface 44 that are connected to each other through an internal bus.

The control unit 41 is configured with a CPU and a ROM and controls the server apparatus 3 by executing a program stored in the storage unit 43. In addition, the control unit 41 includes an internal timer that tracks time. The RAM 42 is a work area of the control unit 41. The storage unit 43 is a storage region for storing a program and data. The control unit 41 reads the program and the data from the RAM 42 and performs the program execution process based on request information received from the terminal apparatuses 4. The communication interface 44 can connect to the communication network 2 in a wireless or wired manner and can receive data through the communication network 2. Data received through the communication interface 44 is loaded into the RAM 42 and is subjected to the computation process performed by the control unit 41.

A case where the game program of the ninth embodiment is applied to an action RPG will be described. The automatic control process for the player character, the switching process from the automatic control mode to the manual control mode, and the switching process from the manual control mode to the automatic control mode in the ninth embodiment may be executed by only the server apparatus 3 or any one of the terminal apparatuses 4. Alternatively, a part of the processes may be executed by the server apparatus 3, and processes other than the processes executed by the server apparatus 3 may be executed by the terminal apparatuses 4.

The automatic control process for the player character, the switching process from the automatic control mode to the manual control mode, and the switching process from the manual control mode to the automatic control mode in the ninth embodiment can be executed in accordance with the flowcharts in FIG. 5 to FIG. 7, respectively, in the same manner as in the seventh embodiment. The program execution screen in the ninth embodiment can be the same as the program execution screen illustrated in FIG. 8 in the seventh embodiment.

As one aspect of the ninth embodiment, a game program of high interest can be provided.

As one aspect of the ninth embodiment, the first player character is caused to act advantageously for the first player character and the second player character. Thus, the player does not feel that the first player character does not sufficiently perform the role in the progress of the game, and the interest of the game can be increased.

As one aspect of the ninth embodiment, the first player character acts to satisfy the first predetermined condition, and the second player character acts not to satisfy the first predetermined condition. Thus, for example, in a case where the first predetermined condition is a condition for generating an advantageous effect for the first player character or the second player character, the player does not feel that the first player character does not sufficiently perform the role in the progress of the game, and the interest of the game can be increased.

As one aspect of the ninth embodiment, the action of the first player character is set to vary depending on the type or the result of attack on the first player character from the enemy character that acts as the enemy of the first player character and the second player character. Thus, the first player character can be caused to execute the action corresponding to the type or the result of attack from the enemy character, and the interest of the game can be increased.

As one aspect of the ninth embodiment, the first player character attacks the enemy character with a higher frequency than the second player character. Thus, the player does not feel that the first player character does not sufficiently attack the enemy character, and the interest of the game can be increased.

As one aspect of the ninth embodiment, the number of times of consecutive attack in a case of consecutively attacking the enemy character is set to be higher for the first player character than for the second player character. Thus, the player does not feel that the first player character does not sufficiently attack the enemy character, and the interest of the game can be increased.

As one aspect of the ninth embodiment, the first player character can be switched to the second player character, and the second player character can be switched to the first player character by the operation of the player. Thus, since the player can appropriately select the player character, the interest of the game can be increased.

As one aspect of the ninth embodiment, in a case where the operation for controlling the action of the first player character is not performed, the action of the first player character is subjected to the automatic control. In a case where the operation for controlling the action of the first player character is performed, the action of the first player character is controlled in accordance with the operation. Thus, the automatic control and the manual control of the first player character can be switched using a simple method.

As one aspect of the ninth embodiment, in a case where the first player character is subjected to the automatic control, when one enemy character is selected by the operation of the player, the first player character is subjected to the automatic control to execute the attack on the selected enemy character. When the enemy character is not selected, the attack is executed on the enemy character on which the attack can be executed. Thus, even in a case of the automatic control, the player can select whether or not to target the enemy character.

As one aspect of the ninth embodiment, the mark which enables the enemy character as the target of attack of the first player character to be visually recognized is displayed. Furthermore, in a case where the action of the first player character is subjected to the automatic control, the mark is displayed in a manner that enables execution of the automatic control to be visually recognized. Thus, the player can easily visually recognize a state where the first player character is subjected to the automatic control.

As one aspect of the ninth embodiment, in a case where the action of the first player character is subjected to the automatic control, the virtual camera is automatically controlled. Thus, the player can progress in the game and check the progress situation of the game even without performing any operation.

As one aspect of the ninth embodiment, the plurality of states where the action speed of the first player character and the effect of the action executed by the first player character vary are provided, and the action of the first player character is subjected to the automatic control in accordance with the set state. Thus, the automatic control of the first player character can be changed.

As one aspect of the ninth embodiment, in a case where the first player character is subjected to the automatic control, the automatic control can be released only in a case where the predetermined operation button and/or the predetermined operation stick is operated among the operation buttons and/or the operation sticks set as the operation for controlling the action of the first player character.

As one aspect of the ninth embodiment, even in a case where the second predetermined condition for generating the vibration in the input device is satisfied, the vibration may not be generated in a case where the action of the first player character is subjected to the automatic control.

As one aspect of the ninth embodiment, even in a case where the vibration is set to be generated in a case where the second predetermined condition is satisfied, the vibration may not be generated in a case where the action of the first player character is subjected to the automatic control.

As one aspect of the ninth embodiment, in a case where the action of the first player character is subjected to the automatic control, the vibration is not generated even in a case where the second predetermined condition is satisfied. However, in a case of the automatic control, the vibration can be generated in a case where the second predetermined condition is satisfied by executing the predetermined action by the operation of the player.

As one aspect of the ninth embodiment, the difficulty level of the game can be selected by the operation of the player, and whether or not to execute the automatic control of the first player character can be switched in accordance with the selected difficulty level.

As one aspect of the ninth embodiment, the plurality of states where the action speed of the first player character and the type of action executed by the first player character vary are provided, and the action of the first player character is subjected to the automatic control in accordance with the set state. Thus, the automatic control of the first player character can be changed.

In the ninth embodiment, each of the "computer apparatus", the "input device", the "first player character", the "second player character", the "action", the "automatic control of the action", and the "action setting" can employ the contents disclosed in the first embodiment as necessary.

In the ninth embodiment, the "first predetermined condition" can employ contents disclosed in the third embodiment as necessary. In the ninth embodiment, the "enemy character", the "attack", the "type of attack", and the "result of attack" can employ the contents disclosed in the fourth embodiment as necessary.

In the ninth embodiment, the "mark", the "virtual camera", the "action speed of the player character", the "effect of the action", the "vibration", the "second predetermined condition", and the "difficulty level of the game" can employ contents disclosed in the seventh embodiment as necessary.

APPENDIX

The description of the embodiments described above has been described so that those having ordinary knowledge in the field to which the invention belongs can carry out the following invention.

[1] A game program executed in a computer apparatus including an input device, the game program causing the computer apparatus to function as:

a manual controller that controls an action of a first player character in accordance with an operation of a player;

a first automatic controller that performs an automatic control of the action of the first player character;

a control switcher that switches between a control performed by the manual controller and a control performed by the first automatic controller; and a second automatic controller that performs an automatic control of an action of a second player character acting as an ally of the first player character, wherein the automatic control performed by the first automatic controller is executed based on different action setting from the automatic control performed by the second automatic controller.

[2] The game program according to [1], wherein action setting of the automatic control performed by the first automatic controller causes the first player character to act advantageously for the first player character and the second player character, compared to action setting of the automatic control performed by the second automatic controller.

[3] The game program according to [1] or [2], wherein action setting of the automatic control performed by the first automatic controller causes the first player character to act to satisfy a first predetermined condition, and action setting of the automatic control performed by the second automatic controller causes the second player character to act to not satisfy the first predetermined condition or causes the second player character to act regardless of whether or not to satisfy the first predetermined condition.

[4] The game program according to any one of [1] to [3], wherein action setting of the automatic control performed by the first automatic controller is set such that the action of the first player character varies depending on a type or a result of attack from an enemy character that acts as an enemy of the first player character and the second player character.

[5] The game program according to any one of [1] to [4], wherein action setting of the automatic control performed by the first automatic controller is set such that a frequency of attacking an enemy character that acts as an enemy of the first player character and the second player character is increased, compared to action setting of the automatic control performed by the second automatic controller.

[6] The game program according to any one of [1] to [5], wherein action setting of the automatic control performed by the first automatic controller is set such that the number of times of consecutive attack in a case of consecutively attacking an enemy character that acts as an enemy of the first player character and the second player character is increased, compared to action setting of the automatic control performed by the second automatic controller.

[7] The game program according to any one of [1] to [6], further causing the computer apparatus to function as:

a character switcher that switches the first player character to the second player character and switches the second player character to the first player character by the operation of the player.

[8] The game program according to any one of [1] to [7], wherein, in a case where an operation for controlling the action of the first player character is not performed, the first automatic controller controls the action of the first player character, and in a case where the operation for controlling the action of the first player character is performed, the manual controller controls the action of the first player character.

[9] The game program according to any one of [1] to [8], further causing the computer apparatus to function as:

an enemy character selector that selects one enemy character acting as an enemy of the first player character and the second player character by the operation of the player, wherein, in a case where the enemy character is selected by the enemy character selector, the first automatic controller controls the first player character to execute attack on the selected enemy character, and in a case where the enemy character is not selected, the first automatic controller controls the first player character to execute the attack on an enemy character on which the attack can be executed.

[10] The game program according to any one of [1] to [9], further causing the computer apparatus to function as:

an attack target display that displays a mark which enables an enemy character as a target of attack of the first player character to be visually recognized among enemy characters acting as an enemy of the first player character and the second player character, wherein, in a case where the action of the first player character is subjected to the automatic control by the first automatic controller, the attack target display displays the mark in a manner that enables execution of the automatic control of the action of the first player character by the first automatic controller to be visually recognized.

[11] The game program according to any one of [1] to [10], further causing the computer apparatus to function as:

a camera controller that automatically controls a virtual camera in a case where the action of the first player character is subjected to the automatic control by the first automatic controller; and an image display that displays an image of an inside of a virtual space captured by the virtual camera.

[12] The game program according to any one of [1] to [11], further causing the computer apparatus to function as:

a state setter that sets any of a plurality of states where an action speed of the first player character and an effect of an action executed by the first player character vary, wherein the first automatic controller performs the automatic control of the action of the first player character in accordance with the set state.

[13] The game program according to any one of [1] to [12], wherein the input device includes at least one operation button and at least one operation stick, and wherein, in a case where the action of the first player character is controlled by the first automatic controller, and in a case where a predetermined operation button and/or a predetermined operation stick is operated among operation buttons and/or operation sticks set as an operation for controlling the action of the first player character, the control of the action of the first player character by the first automatic controller is released and the action of the first player character is controlled by the manual controller, and in a case where an operation button and/or an operation stick other than the predetermined operation button and/or the predetermined operation stick is operated, the control of the action of the first player character by the first automatic controller continues without being released.

[14] The game program according to any one of [1] to [13], wherein the input device includes a vibration generator for generating vibration that can be transmitted to the player holding the input device, wherein the game program further causes the computer apparatus to function as:

a vibration controller that performs a control for generating the vibration by the vibration generator in a case where a second predetermined condition is satisfied, and wherein, in a case where the action of the first player character is subjected to the automatic control in the first automatic controller, the vibration controller does not perform the control for generating the vibration even in a case where the second predetermined condition is satisfied.

[15] The game program according to [14], further causing the computer apparatus to function as:

a vibration necessity setter that sets whether or not to generate the vibration by the vibration generator, wherein, in a case where generating the vibration is set by the vibration necessity setter, and the action of the first player character is subjected to the automatic control in the first automatic controller, the vibration controller does not perform the control for generating the vibration even in a case where the second predetermined condition is satisfied.

[16] The game program according to [14] or [15], further causing the computer apparatus to function as:

an action selector that selects a predetermined action to be executed by the first player character by the operation of the player; and an action executer that executes the selected action, wherein, in a case where the action of the first player character is subjected to the automatic control in the first automatic controller, the vibration controller performs the control for generating the vibration in a case where the second predetermined condition is satisfied by executing the selected action.

[17] The game program according to any one of [1] to [16], further causing the computer apparatus to function as:

a difficulty level selector that selects a difficulty level of a game by the operation of the player, wherein whether or not to execute the automatic control of the first player character by the first automatic controller is switched in accordance with the selected difficulty level.

[18] The game program according to any one of [1] to [17], further causing the computer apparatus to function as:

a state setter that sets any of a plurality of states where an action speed of the first player character and a type of action executed by the first player character vary, wherein the first automatic controller performs the automatic control of the action of the first player character in accordance with the set state.

[19] A game apparatus including an input device, the game apparatus comprising:

a manual controller that controls an action of a first player character in accordance with an operation of a player;

a first automatic controller that performs an automatic control of the action of the first player character;

a control switcher that switches between a control performed by the manual controller and a control performed by the first automatic controller; and a second automatic controller that performs an automatic control of an action of a second player character acting as an ally of the first player character, wherein the automatic control performed by the first automatic controller is executed based on different action setting from the automatic control performed by the second automatic controller.

[20] A game execution method executed in a computer apparatus including an input device, the game execution method comprising:

performing a manual control of an action of a first player character in accordance with an operation of a player;

performing a first automatic control that is an automatic control of the action of the first player character;

switching between the manual control and the first automatic control; and performing a second control that is an automatic control of an action of a second player character acting as an ally of the first player character, wherein the automatic control performed in the first automatic control is executed based on different action setting from the automatic control performed in the second automatic control.

[21] A game program executed by a server apparatus in a game system including a terminal apparatus that includes an input device and is operated by a player, and the server apparatus that can connect to and communicate with the terminal apparatus, the game program causing the server apparatus to function as:

a manual controller that controls an action of a first player character in accordance with an operation of the player;

a first automatic controller that performs an automatic control of the action of the first player character;

a control switcher that switches between a control performed by the manual controller and a control performed by the first automatic controller; and a second automatic controller that performs an automatic control of an action of a second player character acting as an ally of the first player character, wherein the automatic control performed by the first automatic controller is executed based on different action setting from the automatic control performed by the second automatic controller.

[22] A server apparatus on which the game program according to [21] is installed.

[23] A game system including a terminal apparatus that includes an input device and is operated by a player, and a server apparatus that can connect to and communicate with the terminal apparatus, the game system comprising:

a manual controller that controls an action of a first player character in accordance with an operation of the player;

a first automatic controller that performs an automatic control of the action of the first player character;

a control switcher that switches between a control performed by the manual controller and a control performed by the first automatic controller; and a second automatic controller that performs an automatic control of an action of a second player character acting as an ally of the first player character, wherein the automatic control performed by the first automatic controller is executed based on different action setting from the automatic control performed by the second automatic controller.

[24] A game program executed by a terminal apparatus in a game system including the terminal apparatus that includes an input device and is operated by a player, and a server apparatus that can connect to and communicate with the terminal apparatus, the game program causing the terminal apparatus to function as:

a manual controller that controls an action of a first player character in accordance with an operation of the player;

a first automatic controller that performs an automatic control of the action of the first player character;

a control switcher that switches between a control performed by the manual controller and a control performed by the first automatic controller; and a second automatic controller that performs an automatic control of an action of a second player character acting as an ally of the first player character, wherein the automatic control performed by the first automatic controller is executed based on different action setting from the automatic control performed by the second automatic controller.

[25] A terminal apparatus on which the game program according to [24] is installed.

[26] A game execution method executed by a server apparatus in a game system including a terminal apparatus that includes an input device and is operated by a player, and the server apparatus that can connect to and communicate with the terminal apparatus, the game program execution method comprising:

in the server apparatus, performing a manual control of an action of a first player character in accordance with an operation of the player;

performing a first automatic control that is an automatic control of the action of the first player character;

switching between the manual control and the first automatic control; and performing an automatic control of an action of a second player character acting as an ally of the first player character, wherein the automatic control performed in the first automatic control is executed based on different action setting from the automatic control performed in the second automatic control.

[27] A game execution method executed by a game system including a terminal apparatus that includes an input device and is operated by a player, and a server apparatus that can connect to and communicate with the terminal apparatus, the game execution method comprising:

in the game system, performing a manual control of an action of a first player character in accordance with an operation of the player;

performing a first automatic control that is an automatic control of the action of the first player character;

switching between the manual control and the first automatic control; and performing an automatic control of an action of a second player character acting as an ally of the first player character, wherein the automatic control performed in the first automatic control is executed based on different action setting from the automatic control performed in the second automatic control.

What is claimed is:

1. A non-transitory computer-readable recording medium including a game program executed in a computer apparatus including an input device, the game program causing the computer apparatus to function as:
   a manual controller that controls an action of a first player character in accordance with an operation of a player;
   a first automatic controller that performs an automatic control of the action of the first player character;
   a control switcher that switches between a control performed by the manual controller and a control performed by the first automatic controller; and
   a second automatic controller that performs an automatic control of an action of a second player character acting as an ally of the first player character,
   wherein the automatic control performed by the first automatic controller is executed based on different action setting from the automatic control performed by the second automatic controller.

2. The non-transitory computer-readable recording medium according to claim 1,
   wherein action setting of the automatic control performed by the first automatic controller causes the first player character to act advantageously for the first player character and the second player character, compared to action setting of the automatic control performed by the second automatic controller.

3. The non-transitory computer-readable recording medium according to claim 1,
   wherein action setting of the automatic control performed by the first automatic controller causes the first player character to act to satisfy a first predetermined condition, and action setting of the automatic control performed by the second automatic controller causes the second player character to act to not satisfy the first predetermined condition or causes the second player character to act regardless of whether or not to satisfy the first predetermined condition.

4. The non-transitory computer-readable recording medium according to claim 1,
wherein action setting of the automatic control performed by the first automatic controller is set such that the action of the first player character varies depending on a type or a result of attack from an enemy character that acts as an enemy of the first player character and the second player character.

5. The non-transitory computer-readable recording medium according to claim 1,
wherein action setting of the automatic control performed by the first automatic controller is set such that a frequency of attacking an enemy character that acts as an enemy of the first player character and the second player character is increased, compared to action setting of the automatic control performed by the second automatic controller.

6. The non-transitory computer-readable recording medium according to claim 1,
wherein action setting of the automatic control performed by the first automatic controller is set such that the number of times of consecutive attack in a case of consecutively attacking an enemy character that acts as an enemy of the first player character and the second player character is increased, compared to action setting of the automatic control performed by the second automatic controller.

7. The non-transitory computer-readable recording medium according to claim 1, further causing the computer apparatus to function as:
a character switcher that switches the first player character to the second player character and switches the second player character to the first player character by the operation of the player.

8. The non-transitory computer-readable recording medium according to claim 1,
wherein, in a case where an operation for controlling the action of the first player character is not performed, the first automatic controller controls the action of the first player character, and in a case where the operation for controlling the action of the first player character is performed, the manual controller controls the action of the first player character.

9. The non-transitory computer-readable recording medium according to claim 1, further causing the computer apparatus to function as:
an enemy character selector that selects one enemy character acting as an enemy of the first player character and the second player character by the operation of the player,
wherein, in a case where the enemy character is selected by the enemy character selector, the first automatic controller controls the first player character to execute attack on the selected enemy character, and in a case where the enemy character is not selected, the first automatic controller controls the first player character to execute the attack on an enemy character on which the attack can be executed.

10. The non-transitory computer-readable recording medium according to claim 1, further causing the computer apparatus to function as:
an attack target display that displays a mark which enables an enemy character as a target of attack of the first player character to be visually recognized among enemy characters acting as an enemy of the first player character and the second player character,
wherein, in a case where the action of the first player character is subjected to the automatic control by the first automatic controller, the attack target display displays the mark in a manner that enables execution of the automatic control of the action of the first player character by the first automatic controller to be visually recognized.

11. The non-transitory computer-readable recording medium according to claim 1, further causing the computer apparatus to function as:
a camera controller that automatically controls a virtual camera in a case where the action of the first player character is subjected to the automatic control by the first automatic controller; and
an image display that displays an image of an inside of a virtual space captured by the virtual camera.

12. The non-transitory computer-readable recording medium according to claim 1, further causing the computer apparatus to function as:
a state setter that sets any of a plurality of states where an action speed of the first player character and an effect of an action executed by the first player character vary,
wherein the first automatic controller performs the automatic control of the action of the first player character in accordance with the set state.

13. The non-transitory computer-readable recording medium according to claim 1,
wherein the input device includes at least one operation button and at least one operation stick, and
wherein, in a case where the action of the first player character is controlled by the first automatic controller, and in a case where a predetermined operation button and/or a predetermined operation stick is operated among operation buttons and/or operation sticks set as an operation for controlling the action of the first player character, the control of the action of the first player character by the first automatic controller is released and the action of the first player character is controlled by the manual controller, and in a case where an operation button and/or an operation stick other than the predetermined operation button and/or the predetermined operation stick is operated, the control of the action of the first player character by the first automatic controller continues without being released.

14. The non-transitory computer-readable recording medium according to claim 1,
wherein the input device includes a vibration generator for generating vibration that can be transmitted to the player holding the input device,
wherein the game program further causes the computer apparatus to function as:
a vibration controller that performs a control for generating the vibration by the vibration generator in a case where a second predetermined condition is satisfied, and
wherein, in a case where the action of the first player character is subjected to the automatic control in the first automatic controller, the vibration controller does not perform the control for generating the vibration even in a case where the second predetermined condition is satisfied.

15. The non-transitory computer-readable recording medium according to claim 14, further causing the computer apparatus to function as:
a vibration necessity setter that sets whether or not to generate the vibration by the vibration generator,
wherein, in a case where generating the vibration is set by the vibration necessity setter, and the action of the first player character is subjected to the automatic control in the first automatic controller, the vibration controller does not perform the control for generating the vibration even in a case where the second predetermined condition is satisfied.

16. The non-transitory computer-readable recording medium according to claim 14, further causing the computer apparatus to function as:
an action selector that selects a predetermined action to be executed by the first player character by the operation of the player; and
an action executer that executes the selected action,
wherein, in a case where the action of the first player character is subjected to the automatic control in the first automatic controller, the vibration controller performs the control for generating the vibration in a case where the second predetermined condition is satisfied by executing the selected action.

17. The non-transitory computer-readable recording medium according to claim 1, further causing the computer apparatus to function as:
a difficulty level selector that selects a difficulty level of a game by the operation of the player,
wherein whether or not to execute the automatic control of the first player character by the first automatic controller is switched in accordance with the selected difficulty level.

18. The non-transitory computer-readable recording medium according to claim 1, further causing the computer apparatus to function as:
a state setter that sets any of a plurality of states where an action speed of the first player character and a type of action executed by the first player character vary,
wherein the first automatic controller performs the automatic control of the action of the first player character in accordance with the set state.

19. A game apparatus including an input device, the game apparatus comprising:
a manual controller that controls an action of a first player character in accordance with an operation of a player;
a first automatic controller that performs an automatic control of the action of the first player character;
a control switcher that switches between a control performed by the manual controller and a control performed by the first automatic controller; and
a second automatic controller that performs an automatic control of an action of a second player character acting as an ally of the first player character,
wherein the automatic control performed by the first automatic controller is executed based on different action setting from the automatic control performed by the second automatic controller.

20. A game execution method executed in a computer apparatus including an input device, the game execution method comprising:
performing a manual control of an action of a first player character in accordance with an operation of a player;
performing a first automatic control that is an automatic control of the action of the first player character;
switching between the manual control and the first automatic control; and
performing a second control that is an automatic control of an action of a second player character acting as an ally of the first player character,
wherein the automatic control performed in the first automatic control is executed based on different action setting from the automatic control performed in the second automatic control.

* * * * *